(12) United States Patent
Bunch

(10) Patent No.: US 12,385,197 B1
(45) Date of Patent: Aug. 12, 2025

(54) TIRE DEFLATION DEVICE

(71) Applicant: Jesse Clement Bunch, Silver Spring, MD (US)

(72) Inventor: Jesse Clement Bunch, Silver Spring, MD (US)

( * ) Notice: Subject to any disclaimer, the term of this patent is extended or adjusted under 35 U.S.C. 154(b) by 614 days.

(21) Appl. No.: 17/671,581

(22) Filed: Feb. 14, 2022

Related U.S. Application Data

(60) Continuation-in-part of application No. 16/271,614, filed on Feb. 8, 2019, now Pat. No. 11,247,607, which is a division of application No. 15/330,973, filed on Mar. 16, 2016, now abandoned.

(51) Int. Cl.
| | |
|---|---|
| *E01F 13/12* | (2006.01) |
| *F41H 11/08* | (2006.01) |
| *F42B 6/00* | (2006.01) |
| *F42B 6/02* | (2006.01) |
| *B60C 29/04* | (2006.01) |
| *B60K 35/00* | (2006.01) |
| *B60R 1/00* | (2022.01) |

(52) U.S. Cl.
CPC .............. *E01F 13/12* (2013.01); *F41H 11/08* (2013.01); *F42B 6/003* (2013.01); *F42B 6/02* (2013.01); *B60C 29/04* (2013.01); *B60K 35/00* (2013.01); *B60R 1/00* (2013.01); *B60R 2300/102* (2013.01); *B60R 2300/105* (2013.01); *B60R 2300/205* (2013.01); *B60R 2300/30* (2013.01); *B60R 2300/301* (2013.01); *B60R 2300/302* (2013.01); *B60R 2300/50* (2013.01)

(58) Field of Classification Search
CPC ........ B60C 29/04; B60C 29/068; E01F 13/12; F42B 6/02; F42B 6/003; F41H 11/08

USPC ............................................................ 49/49
See application file for complete search history.

(56) References Cited

U.S. PATENT DOCUMENTS

| | | | | |
|---|---|---|---|---|
| 2,353,386 A | * | 7/1944 | Bourcier ................. | E01F 13/12 411/479 |
| 6,357,961 B1 | * | 3/2002 | Marphetia .............. | E01F 13/12 404/6 |
| 7,275,889 B1 | * | 10/2007 | McGill ................... | E01F 13/12 404/6 |

(Continued)

FOREIGN PATENT DOCUMENTS

| | | | | |
|---|---|---|---|---|
| CH | 649114 A | * | 4/1985 | ............. E01F 13/12 |
| GB | 2452711 A | * | 3/2009 | ............. F42B 12/02 |

OTHER PUBLICATIONS

Machine translation of CH-649114, 1985, 4 pages.*

*Primary Examiner* — Jason R Bellinger
(74) *Attorney, Agent, or Firm* — Bold IP, PLLC; Houda El-Jarrah

(57) ABSTRACT

A pressure-tight container pressure control assembly is configured to adjust internal pressure in a pressure-tight container. The pressure-tight container pressure control assembly has a housing having an attachment end. wherein the attachment end is configured to penetrate a wall of the pressure-tight container. A seal is arranged around the housing and configured to form an airtight seal between the housing and the wall. A pressure controller is arranged in the housing and configured to provide a controlled transfer of a material between the housing and the pressure-tight container through the wall thereby adjusting an internal pressure of the material within the pressure-tight container.

6 Claims, 20 Drawing Sheets

(56) References Cited

U.S. PATENT DOCUMENTS

| | | | | |
|---|---|---|---|---|
| 7,895,788 B1* | 3/2011 | Cilia | .................. | F41G 1/473 |
| | | | | 42/106 |
| 7,988,381 B1* | 8/2011 | Meyer-Pflug | ........... | F41H 11/08 |
| | | | | 404/6 |
| 8,087,847 B2* | 1/2012 | Scott | .................. | E01F 13/12 |
| | | | | 404/6 |
| 8,418,624 B2* | 4/2013 | McGarraugh | ......... | F42B 12/365 |
| | | | | 102/500 |
| 8,506,203 B2* | 8/2013 | Spencer | ................. | E01F 13/12 |
| | | | | 404/6 |
| 8,707,829 B2* | 4/2014 | Kerner | ................. | B29C 73/06 |
| | | | | 81/15.2 |
| 9,067,368 B2* | 6/2015 | Kerner | ................. | B29C 73/08 |
| 9,103,082 B2* | 8/2015 | Castro | ................. | F41H 11/08 |
| 9,896,314 B2* | 2/2018 | Zelinsky | .............. | E01F 13/12 |
| 10,399,397 B2* | 9/2019 | Kerner | ................. | B60C 29/04 |

* cited by examiner

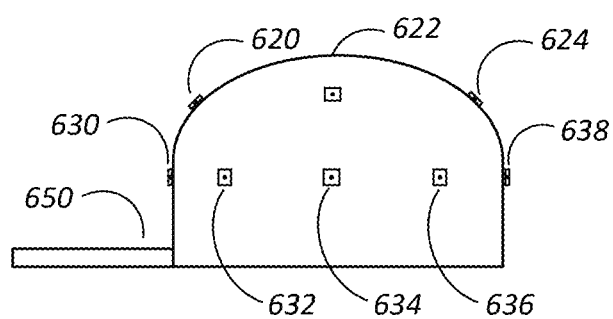
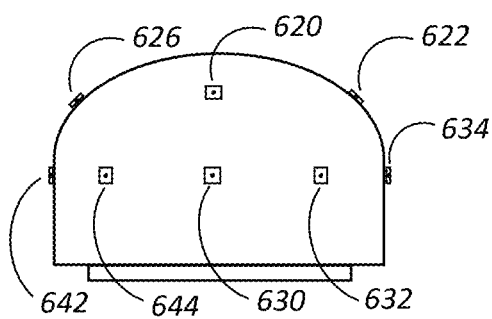
FIG. 8A  FIG. 8B
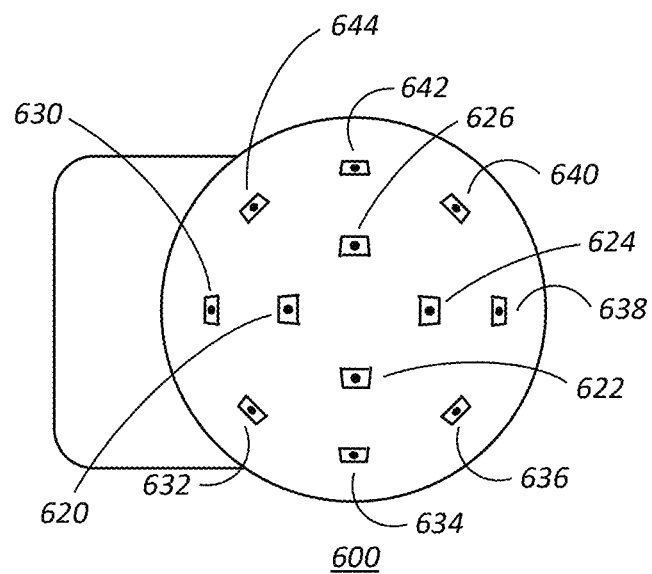
FIG. 8C

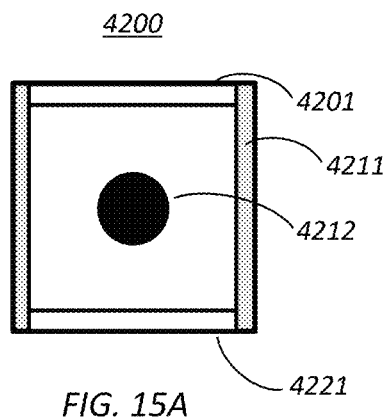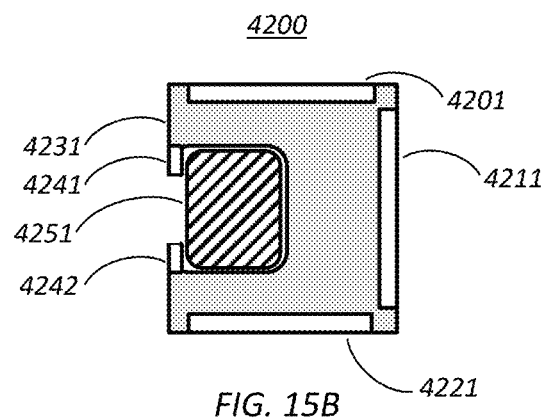
FIG. 15A
FIG. 15B

TIRE DEFLATION DEVICE

RELATED APPLICATION

This application is a continuation in part application of U.S. patent application Ser. No. 16/271,614 filed Feb. 8, 2019, now U.S. Pat. No. 11,247,607, which claims priority to U.S. patent application Ser. No. 15/330,973, which was filed on Mar. 16, 2016, now abandoned which in turn claims priority to provisional patent Application Ser. No. 62/177,498, which was filed on Mar. 16, 2015, which are all incorporated herein by reference.

BACKGROUND

This invention relates to an Extended Perception System that extends the perception of an object's surroundings. Three closely related primary sets of embodiments of this invention include: one set of embodiments is mounted on a set of one or more vehicles; a second set of embodiments is worn by a set of one or more persons and/or animals; and a third set of embodiments which can be in a location fixed with respect to terrestrial and/or other features. Improvements to head-mounted displays are disclosed.

Art related to certain elements of this invention includes security systems with multiple cameras and one display, radio telescope arrays, array microphones, DRIVESENSE®, ONSTAR® black boxes on aircraft, elements of self-driving car technology, 360 car camera systems, dashboard camera systems (such as FALCON ZERO® HD Car Rear-View Dash Cam), and head-mounted displays, such as: GOOGLE GLASS®, OCCULUS RIFT®, MICROSOFT HOLOLENS®, CARL ZEISS CINEMISER® and SONY SMARTEYEGLASS®.

SUMMARY

This invention relates to an Extended Perception System (EXP) that extends the perception of an object's surroundings. Herein "perception" comprises sensing, processing, monitoring, storage of data, provision of intervention regarding the results of any operation(s) on the data and/or any combination thereof. Herein, an "object" can comprise a single object, (for example a vehicle and/or a person), a set, or sets of objects. Herein "surroundings" comprises any area and/or group of areas relevant to said object. As such, said "object" might be local or remote from said "surroundings".

Some embodiments provide a multidirectional view of said object's surroundings. Herein, a "view" can comprise a representation and/or representations of the surroundings resulting from any form of radiant energy emanating from, reflected from, refracted through, and/or diffracted about said surroundings and/or any combination thereof and/or other types of information, including but not limited to other types of data described herein. Herein, "view" comprises view as specified in the previous sentence, in addition to representations derived from previously stored data about the surroundings. Herein, "view" also comprises state data about the object, such as its location and orientation in a coordinate system.

Relative to the object, the perception can be local, remote, and/or any combination thereof. For example, the sensors of the data, the processing of the data, the monitoring of the data, the provision of intervention, and/or the recording of the data can be done locally, remotely and/or any combination thereof. Herein "sensor" refers to a set of one or more sensors and/or virtual sensors.

Three closely related primary sets of embodiments of this invention include: one set of embodiments is mounted on a set of one or more vehicles; a second set of embodiments is worn by a set of one or more persons and/or animals; and a third set of embodiments which can be in a location fixed with respect to terrestrial and/or other features.

EXP Systems can comprise: one or more Sensor Subsystem(s); and/or one or more Processor Subsystem(s); and/or one or more Display Subsystem(s); and/or one or more Monitor Subsystem(s); and/or one or more Intervention Subsystem(s); and/or one or more Storage Subsystem(s), and/one or more Models. Some EXP embodiments may comprise a single of the elements listed in the previous sentence.

BRIEF DESCRIPTION OF THE FIGURES

The detailed description of some embodiments of the invention is made below with reference to the accompanying figures, wherein like numerals represent corresponding parts of the figures.

FIG. 8A illustrates an Extended Perception System embodiment that can be worn by a person.

FIG. 8B illustrates an Extended Perception System embodiment that can be worn by a person.

FIG. 8C illustrates an Extended Perception System embodiment that can be worn by a person.

FIG. 15A illustrates an Extended Perception System Sensor unit 4200 that, in some embodiments, may be movable on head-mounted EXP System with a head-mounted display and an integrated sensor subsystem 4000.

FIG. 15B illustrates an Extended Perception System Sensor unit 4200 that, in some embodiments, may be movable on head-mounted EXP System with a head-mounted display and an integrated sensor subsystem 4000.

DETAILED DESCRIPTION OF CERTAIN EMBODIMENTS

Figure 1:
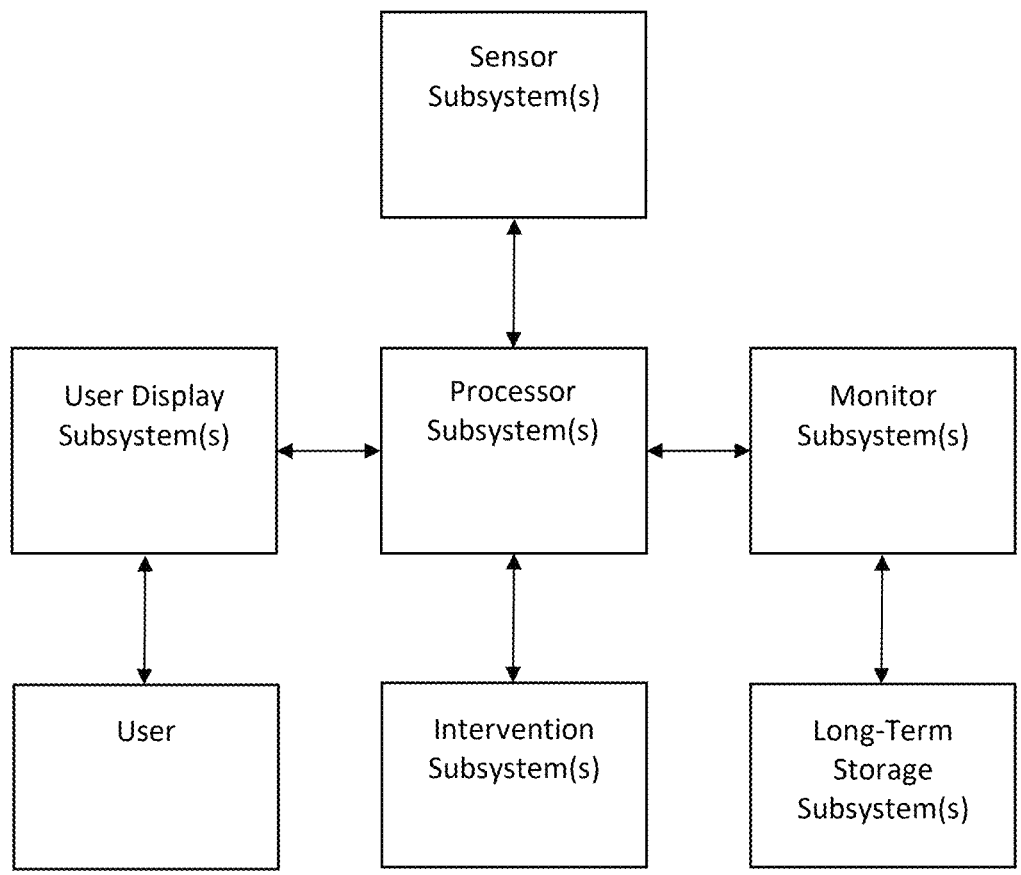
FIG. 1 illustrates an overview of the Sensor-based embodiments of the instant invention.

FIG. 1 illustrates an overview of the Sensor-based embodiments of the instant invention. At least one Sensor Subsystem feeds sensor data to at least one Processor Subsystem. The Processor Subsystem(s) optionally can regulate the Sensor Subsystem(s). The Processor Subsystem(s) can include a short-term loop that temporarily stores a record of the data from the Sensor Subsystem(s). The Display Subsystem(s) potentially can display information from a subset of the other subsystems to the User. In a subset of embodiments, the User can select what information is displayed by the Display Subsystem(s) at a given time. The Monitor Subsystem(s) comprises one or more non-user observers of the situation. There are cases where the Monitor Subsystem comprises the User. The Monitor Subsystem(s), the User, and/or the Processor Subsystem(s) can activate the Intervention Subsystem(s) to intervene so as to influence the outcome of the situation. The Storage Subsystem(s) stores data for a useful period of time.

Shown data paths represent potential data paths not necessarily essential data paths. Shown data paths represent logical data flow when, in practice, data paths might bypass particular subsystems, for example, the User might be able to directly communicate with the Intervention Subsystem(s) without passing first through a Processor Subsystem.

Figure 2A:
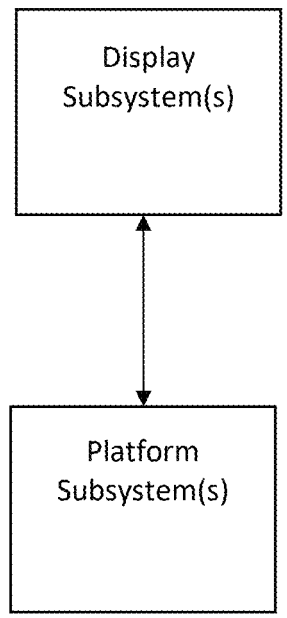
FIG. 2A illustrates an overview of the Platform-based embodiments where the Display Subsystem(s) get the information to display from a Platform such as a Gaming device and/or a computer that generate video display information.

FIG. 2A illustrates an overview of the Platform-based embodiments where the Display Subsystem(s) get the information to display from a Platform such as a Gaming device and/or a computer that generates videos. User feedback to the Platform can alter what information is displayed by the Display Subsystem(s). The source of information to the Display Subsystem(s) can be switched between a set of Platforms, between a set of Sensor Subsystem(s), from a set of Sensor Subsystems to a set of Platforms, and/or from a set of Platforms to a set of Sensor Subsystems.

Figure 2B:
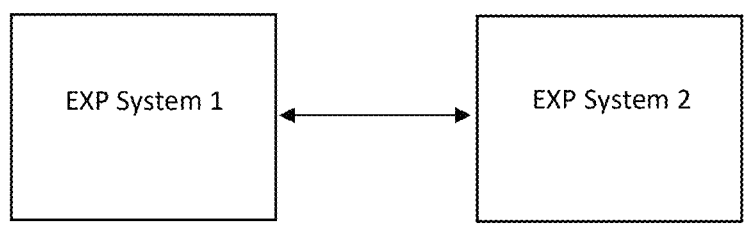
FIG. 2B illustrates that two or more EXP Systems may communicate.

FIG. 2B illustrates that two or more EXP Systems may communicate. One or more EXP Systems may be adapted to communicate with one or more other EXP Systems by one or more of numerous communications known to those with ordinary skill in the art, including, but not limited to in whole or in part, by direct wiring (electronic and/or optical), wirelessly via, short range communications (e.g., BLUETOOTH, IR, WiFi, Near field, etc.), longer range communications such as cell tower communications, and/or long-range communications such as satellite or ULF or radio communications. They may communicate directly and/or through one or more intermediaries. The set of potentially communicating EXP Systems and/or their personal and/or recruited sensors and/or effectors comprise an ExP Ecosystem.

EXP Sensor Subsystem

Input to EXP Sensors can comprise transverse waves such as electromagnet radiation, comprising, for example, one or more of X-ray, UV, visible, IR, microwave, terahertz, and/or radio waves. EXP Sensor input can comprise longitudinal waves such as sound, comprising, for example, one or more of infrasound, audible sound, ultrasound, seismic waves, sound passing through the ground or another solid, a liquid, a gas, a plasma, and/or any mixture or solution of any combination of these. EXP Sensor input can comprise olfactory (identification of chemical composition and/or gradients dissolved in a gas and/or liquid) information. EXP Sensor input can comprise haptic data. Other EXP Sensor input can comprise "state of the user (or another object)" information, such as his or its: location, acceleration, velocity, orientation in space, and/or the values of the user's health and/or functionality, comprising variables normally under homeostatic control (e.g., temperature, $CO_2$ concentration in blood, heart rate, etc.) or any other detectible information. Some information regarding the state of a vehicle can be accessed, for example, by plugging into the OBD-II port of said vehicle. EXP Sensor input can be real and/or virtual.

FIG. 2A illustrates a very simple EXP where the Display Subsystem receives the data to be displayed from a Platform Subsystem, said Platform Subsystem comprising, for example, a gaming platform such as a PS/4 or Xbox 1. Such data to be displayed in this embodiment typically represents data generated by a video game. The Display Subsystem can include controls that can provide input to the Platform Subsystem to affect what it displays.

Figure 3:
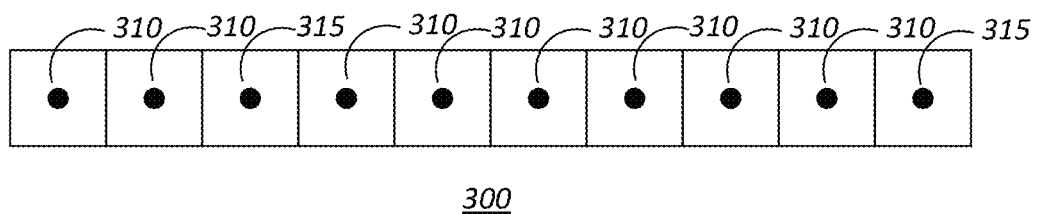
FIG. 3 illustrates a high lens-to-camera ratio array.

FIG. 3 illustrates 300, a high lens-to-camera ratio array (HLCRA). Device 300 comprises a linear array of lenses 310. Some of those lenses 310, designated 315, focus on a light-sensing array, such as a CCD, to form a camera. Many of the lenses 310 do not focus on a light-sensing array and thus are not components of actual cameras. The ratio of total lenses 310 to those focusing to a light-sensing array 315 is typically high (over 2:1) often at least 10:1. There is typically no obvious difference in the casual appearance of a lens that does not focus to a camera and a lens 315 that does. The lens array 300 can be molded as a single unit or the lenses can be made individually. The location of the actual cameras on an HLCRA 300 is random or pseudo-random or some other pattern that makes it difficult for an observer to determine which lens (or lenses) is a part of an actual camera and which are pseudo-cameras. The purpose of HLCRA 300 is to have a minimum number of actual cameras (to reduce the cost) while making it difficult for someone to defeat the system by covering specific lenses. It will be much more difficult to cover an extended array of lenses than a small number of easy-to-identify lenses. If someone were to cover an entire array of lenses, it would be clear that they were attempting to prevent the monitoring and/or recording of the situation . . . a clear indication of negative intent. If someone could cover the entire array, their image would very likely already have been recorded. The HLCRA cameras can be connected to an EXP Processor Subsystem by wires in the back of the array or wirelessly via Bluetooth or another wireless communication system. The normals (the centers of the fields of view) of the cameras can be parallel to one another and perpendicular to the overall surface of HLCRA 300. The normals of one or more of the actual cameras can be tilted vertically to provide a greater vertical field of view, forward or backward to provide a greater horizontal field of view, or any combination thereof. In this case, the normals of pseudo-cameras will also be tilted so the actual cameras cannot be discerned from the pseudo-cameras. The HLCRA 300 can be on a flexible substrate that contains the communication wires (when present). The back can have a peel-off strip revealing an adhesive surface for easy application to the surface on which HLCRA 300 is to be mounted. In this embodiment, the cameras are shown as fixed with respect to the array. In general, the array can be moved relative to the surface it is mounted on and/or individual subsets of the cameras and/or pseudo-cameras can be moved relative to one another.

Figure 4:
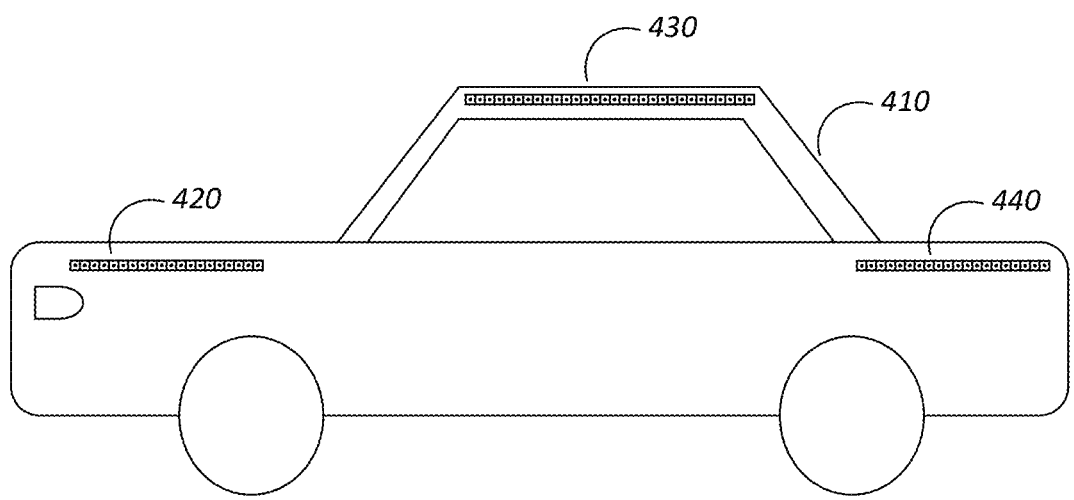
FIG. 4 illustrates an Extended Perception System on the exterior of a car.

FIG. 4 illustrates the use of an Extended Perception System on the exterior of car 410. HLCRA 420 is shown mounted on the front region of the driver's side of the car. HLCRA 430 is shown mounted on middle upper region of the driver's side of the car. HLCRA 440 is shown mounted on rear region of the driver's side of the car. One, two or all of these HLCRAs can be used, as long as a combination of the cameras 315 in the HLCRA(s) can view the entire region on its side of the car. Likewise similar HLCRAs can be mounted on the passenger's side of the car and on the front and rear of the car. Herein, "side" refers to the 6 directions defined by the outfacing normals of a rectangular prism resting on the ground . . . front, back, left and right laterals, top and bottom. HLCRA(s) can also be mounted on any subset of the sides of the car. The HLCRA(s) can be built into a new car 410 or added on later. Similar HLCRAs can be mounted in the trunk or other locations in or on the car 410.

Figure 5A:
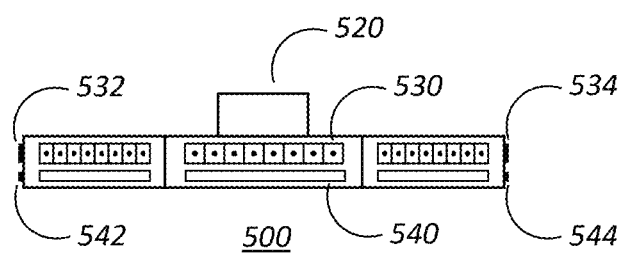
FIG. 5A illustrates an Extended Perception System for use in the interior of a car.
Figure 5B:
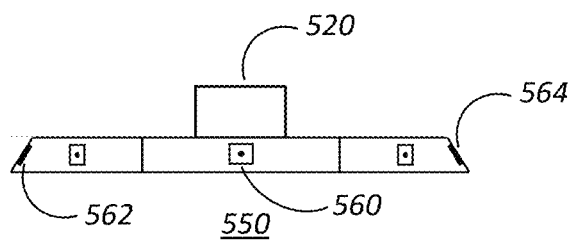
FIG. 5B illustrates an Extended Perception System for use in the interior of a car.
Figure 5C:
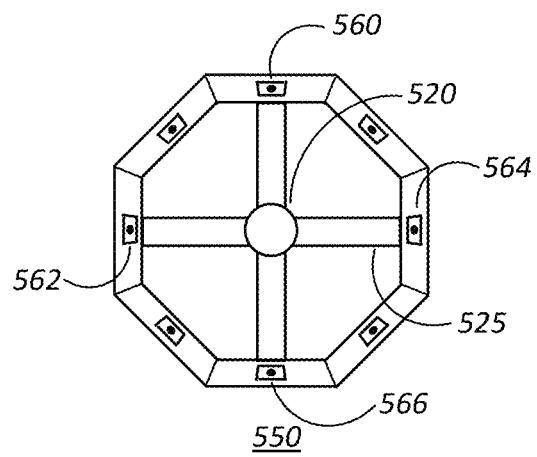
FIG. 5C illustrates an Extended Perception System for use in the interior of a car.
Figure 5D:
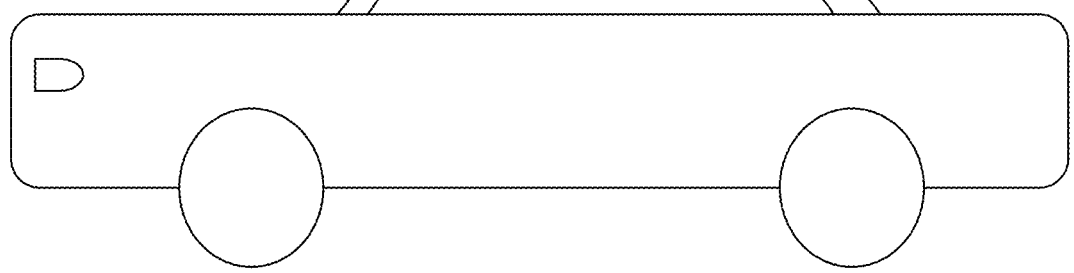
FIG. 5D illustrates an Extended Perception System for use in the interior of a car.

FIGS. 5A-5D illustrate an Extended Perception System 500 for use in the interior of car 510. FIG. 5D illustrates Extended Perception System (EXP) 500 installed in car 510. As illustrated in FIG. 5A, EXP 500 can be mounted such that it is a between the driver and front passenger, preferably above the level of the tops of their heads such that at least some of EXP 500's sensors have a clear line of sight above their heads. It is not required that EXP 500's line of sight be above the heads of the driver and passengers because the extended length of the sensor array provides sufficient parallax such that EXP 500 can view and/or monitor all, or nearly all, of the regions to the sides of the car. Visual sensor array 530 can view the space on the driver's side of car 510. Another visual sensor array can view the space on the front passenger's side of the car 510. Visual sensor array 532 can view the space in the front of car 510. Visual sensor array 534 can view the space behind car 510. Four other visual sensor arrays can view the regions between those of visual sensor arrays 530, the passenger side array, 532, and 534. Each of the visual sensor arrays might also be configured to also view part of the interior of car 510. Each sensor array can be an HLCRA or just an array of one or more sensors. Audio sensor arrays 540, 542, 544 (and the five others) are shown below their respective visual sensor arrays. Mounting 520 is affixed to the interior roof of car 310 and supports the rest of EXP 500.

FIGS. 5B-5C illustrate 550, an optional inner surface of EXP 500. Mounting 520 supports arms 525 that support the rest of 550. Inner Surface 550 views downward with normals oriented between vertical and horizontal. Cameras 560, 562, 564, 566 and the four between each consecutive pair of these provide EXP 500 views of the interior of car 510 including, but not limited to what the driver and passengers are doing. These views can be transmitted to another observer (as described elsewhere herein) and can, for example, be used to assure that observer that the driver and passengers of car 510 are not a threat to said observer or to others.

To better detect sounds outside of a closed vehicle, microphones can be mounted on the outside of said vehicle and/or a sound detection system inside the car can be employed that reflects laser light off the windows to detect the sound vibrations in the glass (as is known in the art). By reflecting the laser light off the surfaces of multiple windows and/or multiple locations on a single window, the reflected light information can be used to capture the sound and, by measuring the delays in the same sounds reaching different parts, that information can be used to locate the source of that sound. One or more glass (or other materials) laser targets can be used with synthetic aperture hardware and/or software to achieve the benefits of that technology.

Other vehicular embodiments can provide cameras in the trunk and/or other areas so that it would be harder for others to plant contraband in the trunk area and/or those other areas.

Figure 6A:
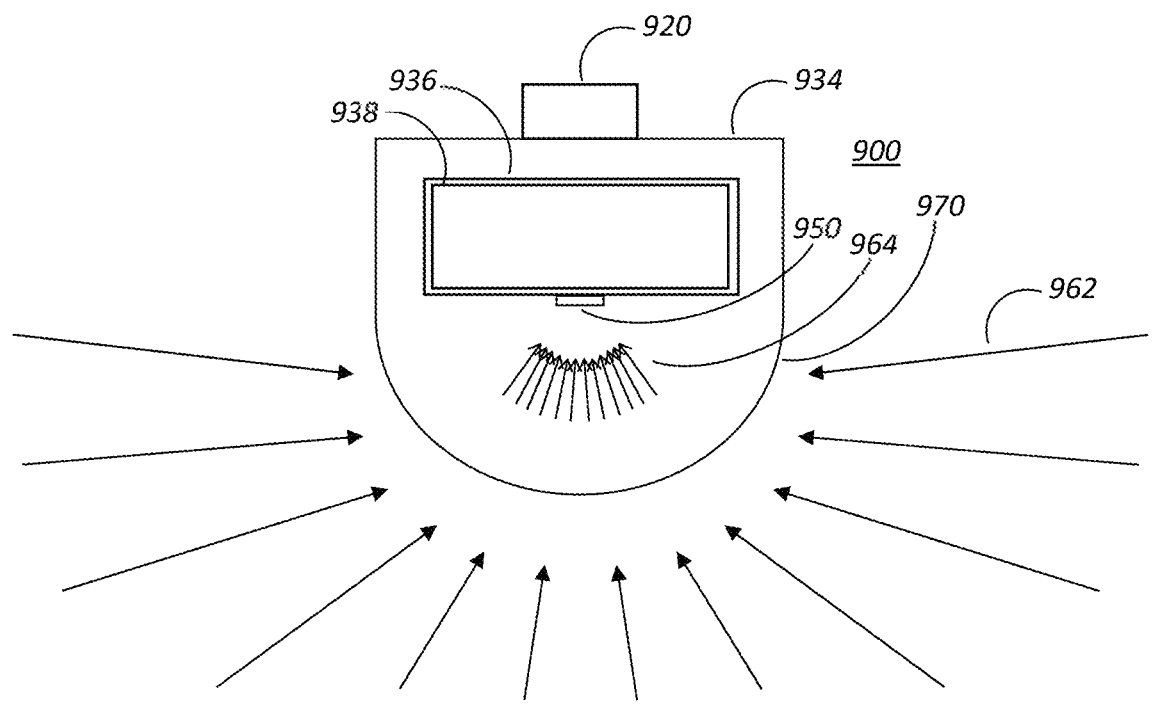
FIG. 6A illustrates an alternative Extended Perception System for use in the interior of a car.
Figure 6B:
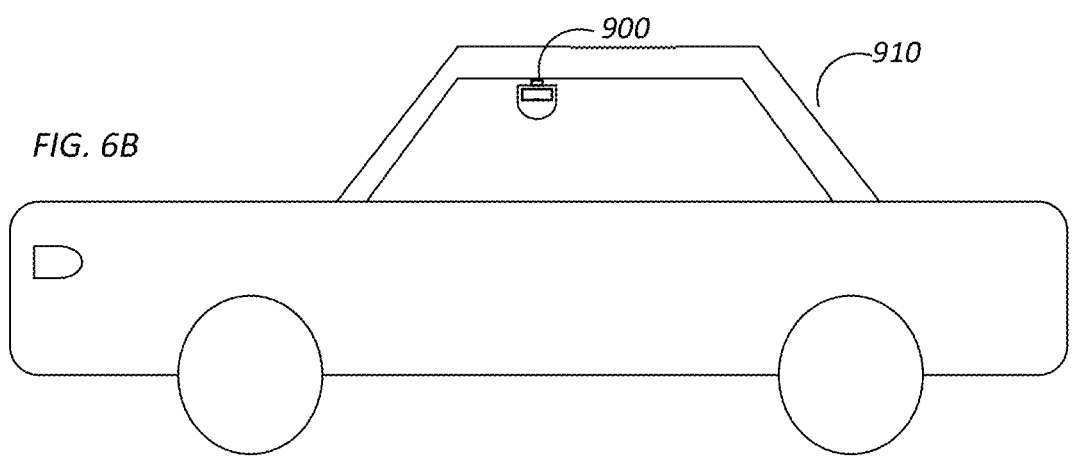
FIG. 6B illustrates an alternative Extended Perception System for use in the interior of a car.

FIGS. 6A and 6B illustrate an alternative Extended Perception System (EXP) 900 for use in the interior of car 910. FIG. 6B illustrates Extended Perception System 900 installed in car 910. These embodiments are designed to reduce the EXP's cost by employing a mobile device to collect the sensor data and transmit it. FIG. 6A illustrates an embodiment where the mobile device is embedded in the EXP 900. Mounting 920 is affixed to the interior roof of car 910 and supports housing 934. Opening 936 in housing 934 supports adapter tray 938. Adapter tray 938 supports the mobile device in such a way that the mobile device will be held securely in opening 936 and aligns one of the mobile device's camera lenses with EXP 900's terminal optics 950. EXP 900 optics 970 redirect light rays 962 from EXP 900's surroundings to the paths 964. An app on the mobile device can transform the image, distorted by EXP's optics, into standard images. This stream can then be input to an app on the mobile device such as Meerkat or Periscope to broadcast images of the surroundings via a cellular network. Alternatively, the broadcast app can transmit the distorted image that can then be corrected after transmission. The image stream can be used for perception (such as, displayed locally and/or sent to an EXP Monitoring Subsystem and/or a storage subsystem). EXP 900 can be linked to the electrical system of car 910 to keep the mobile device that is being used by EXP 900 charged. The mobile device can be controlled or used for other functions via voice control. EXP 900's optional EXP display subsystem can have a mode where it displays the image of the mobile device's display for any of its functions.

Figure 7A:
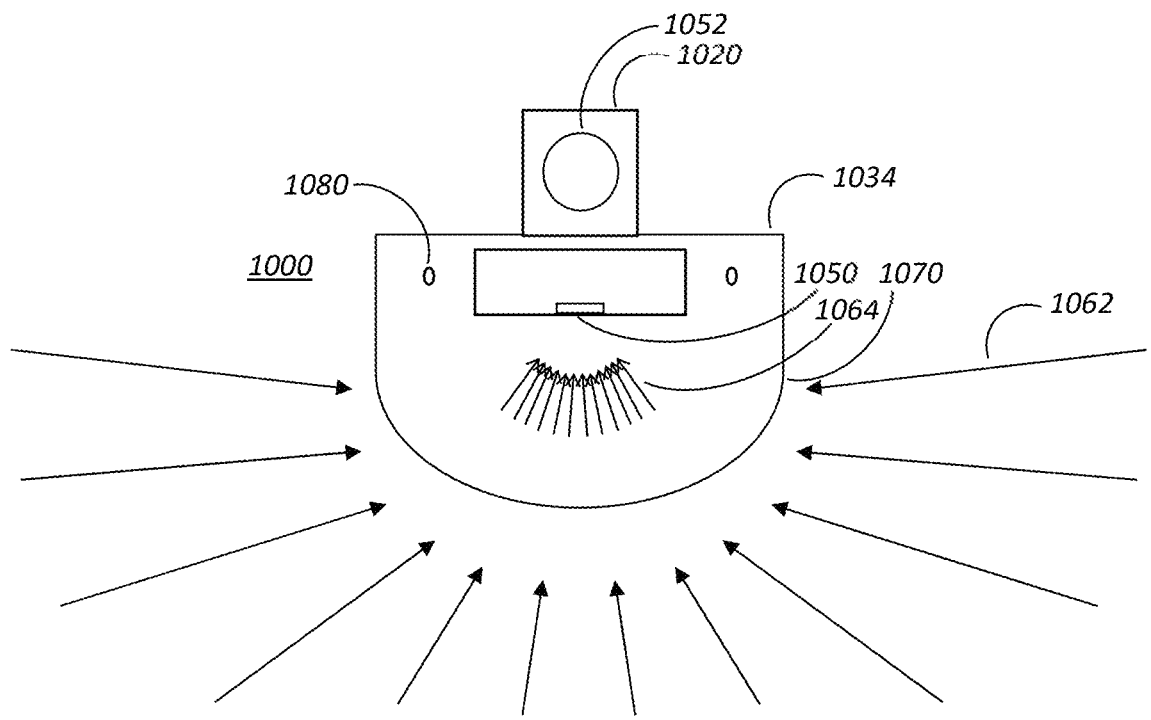
FIG. 7A illustrates a second alternative Extended Perception System for use in the interior of a car.
Figure 7B:
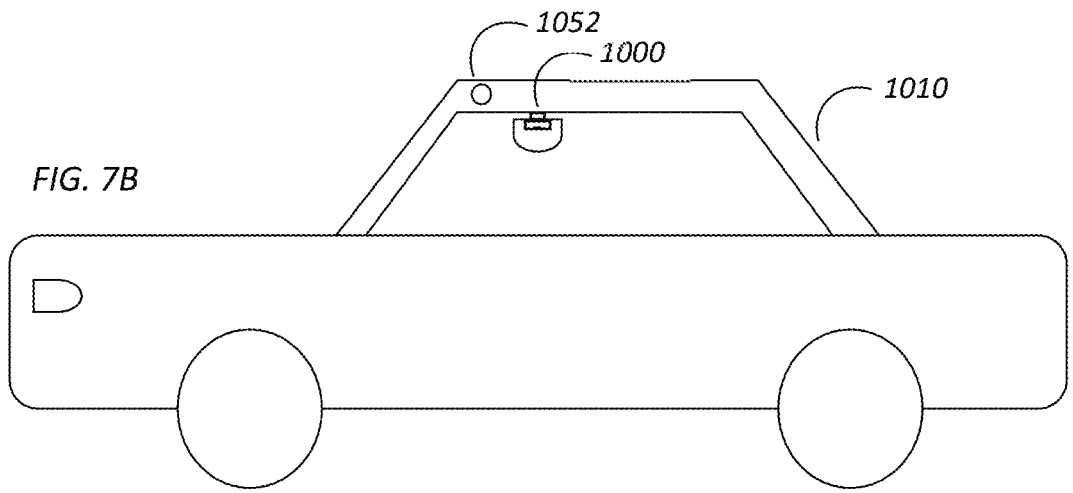
FIG. 7B illustrates a second alternative Extended Perception System for use in the interior of a car.

FIGS. 7A and 7B illustrate a second alternative Extended Perception System (EXP) 1000 for use in the interior of car 1010. FIG. 7B illustrates Extended Perception System 1000 installed in car 1010. Like EXP 900, this embodiment is designed to reduce the EXP's cost by employing a mobile device to collect the sensor data and transmit it. FIG. 7 illustrates an embodiment where the mobile device is located separately from EXP 1000. Mounting 1020 is affixed to the interior roof of car 1010 and supports housing 1034. EXP 1000 optics 1070 redirect light rays 1062 to the paths 1064. Light rays 1064 are redirected via EXP 1000's camera 1050. A separate unit mounted on, or near, car 1010's dash supports the mobile device. Said separate unit can be connected to car 1010's electrical system, such that when the mobile device is plugged therein, its battery can be charged. Camera 1050's output is transmitted to the mobile device via wire or wirelessly. An app on the mobile device can transform the image, distorted by EXP's optics, to normal images. This stream can then be input to an app, such as Meerkat or Periscope, on the mobile device to broadcast images of car 1010's surroundings via a cellular network to a Monitor Subsystem. Alternatively, the broadcast app can transmit the distorted image that can then be corrected after transmission. The image stream can be used for perception (such as, displayed locally and/or sent to an EXP Monitoring Subsystem and/or a storage subsystem). The mobile device's display can be used as the entirety, or part of, the EXP 1000 display subsystem. One of multiple optional lasers 1080 reflects off a window (or windshield) to collect sound information to be processed, for example, in the mobile device then made audible to the driver and/or passengers of car 1010 and/or to be uploaded to the Monitor Subsystem. Likewise, data from car 1010's computer can be accessed via its OBD II port and sent wirelessly or via wire to the mobile device. Said Monitor System, for example, can be one or more individuals in a distant location, observing and/or recording what the EXP sensing subsystem is perceiving.

An embodiment of EXP 1000 can be temporarily assigned to a vehicle. Mount 1020, for example, can contain a magnet powerful enough to secure EXP 1000 to the interior ceiling of a vehicle as the roofs of most vehicles are mostly steel, which is ferromagnetic. In this case, the data can be wirelessly transmitted to a Monitoring Subsystem such that safely located monitors can observe the actions in the interior of the vehicle and hear what is occurring therein and observe where the vehicle is and where it is going. This function can be enhanced by the incorporation of a GPS unit in EXP 1000.

EXP 900 and EXP 1000 observe 3600 (as viewed from above) around the car 910 or 1010 respectively. Because the EXP System observes the rear of the vehicle, the EXP System can replace the rear view mirror.

FIGS. 8A-8C illustrate EXP 600, an embodiment that can be worn by a person. In this embodiment, visual sensors are mounted on a hat. Alternatively, said sensors can be mounted on a helmet, glasses, a flexible net, and/or any other structure worn on the head and/or any other part of the body. Visual sensors 620, 630, 632, and 644 can view the direction in front of the person's head. Visual sensors 622, 632, 634, and 636 can view to the side left of the person's face. Visual sensors 626, 640, 642, and 644 can view to the side right of the person's face. Visual sensors 624, 636, 638, and 640 can view the direction behind the person's face. This allows the user to monitor what is going on behind him, like having eyes in the back of one's head. Visual sensors 620, 622, 624, and 626 can view the space approximately normal to the plane defined by the eyes and ears. Thus, when a user has his head in the position typically associated with walking, visual sensors 620, 622, 624, and 626 view the space above the user's head.

Note that a subset of the sensors in all EXP embodiments can be movable and/or fixed depending on what is most cost-effective in a specific application. This includes, but is not limited to, vehicle-mounted, head-mounted sensors and/or recruited sensors. Directional sensors can be directed towards the target of interest.

EXP recruited sensors are any sensors and/or sensor subsystems whose output may be made available to one or more EXP Systems that are not already dedicated to said EXP Systems. E×P sensor recruitment may also include adjusting sensor parameters, depending upon permissions from said recruited sensors' owners. For example, EXP recruitment for a video camera may include, but not be limited to: turning it on or off; setting the field of view, the direction of view, the focal distance, automatic focus mode, the frame rate, the aperture, the shutter speed, and/or the white balance; a command to track one or more objects; and/or direction to where to upload feeds. EXP recruitment of other sensors will depend upon what variables said EXP System has access to and permission to alter. EXP Systems may recruit sensors and/or sensor subsystems from any available source, including, but not limited to: people and/or vehicles, especially those equipped with EXP Systems; other EXP Systems; one or more subsets of the Internet of Things; mobile sensors, such as relevant body cams, cell phones, and/or AR glasses; and/or cameras affixed to commercial buildings, homes, traffic cameras, other security cameras and/or other sensors. For example, an EXP System may recruit people with cell phones, AR glasses/phones, and/or other sensors in the physical proximity of an event and may request them to direct their cameras and/or microphones to some subset of said event. EXP Sensor recruitment may include requests and/or commands for recruited sensors to alter parameters before, during, and/or after said event.

EXP Display Subsystem

Independent of the sensor input type, the sensor output can be displayed visually, auditorally, olfactorally, gustatorially, haptically, kinesthetically, and/or by any means perceivable by the user. The user can be human, animal, other natural organism and/or artificially intelligent. Data displayed as olfactory information can be very useful to dogs, even more useful to sharks whose brain structures for evaluating olfactory information are comparable to those that humans used to evaluate visual information.

Below each sensor in EXP 600 can be a vibration device that informs the user when there is a stimulus of potential importance and/or interest in the field of view of that sensor. Said vibration can inform the user that he should consider looking in that direction to get more information on the stimulus. If said stimulus is in the field of view of multiple sensors, an EXP Processor Subsystem built into brim 650 can deploy different response algorithms depending upon the nature of said stimulus. For example, a stimulus deemed to be of moderate importance and/or interest might only trigger vibration in the sensor which has that visual stimulus closest to the center of its "field of view", or multiple sensors if it is relatively equidistant from said multiple sensors. A stimulus deemed to be of greater importance and/or interest might trigger a vibration under all of the visual sensors that can view it. Different simultaneous stimuli of interest can be distinguished by different frequencies of vibration. Different degrees of potential importance of stimuli can be mapped to different intensities of the vibrations. As the user moves his head, the locus of the vibrations changes to indicate the direction of the stimulus relative to the user's current head orientation.

Another means to inform the user of a stimulus of interest is by auditory feedback. For example, the EXP Processor Subsystem can create auditory signals, fed to the user's ears separately and tailored to cause the human auditory system to perceive the direction of the combined signal as the same as the stimulus of interest. Different intensities, frequencies and/or patterns in the auditory feedback can be used to signal different types of information about the stimulus to the user.

A means to provide an EXP user information from one or more ExP sensors is to display that information. For example, said information can be displayed on a display in a fixed location within a car. Different camera views can be displayed in different windows on the display so as to potentially monitor the entire surrounding space simultaneously.

Amplified Glance Angle Mode

Information from an EXP Sensor Subsystem can be shown on a display that is worn. Such wearable displays can include watches such as the APPLE® watch and/or head-mounted devices, such as GOOGLE GLASS®, OCCULUS RIFT®, MICROSOFT®, CARL ZEISS CINEMISER®, and SONY SMARTEYEGLASS®. There are numerous ways to display such data on head-mounted displays known to the art.

Figure 9A:
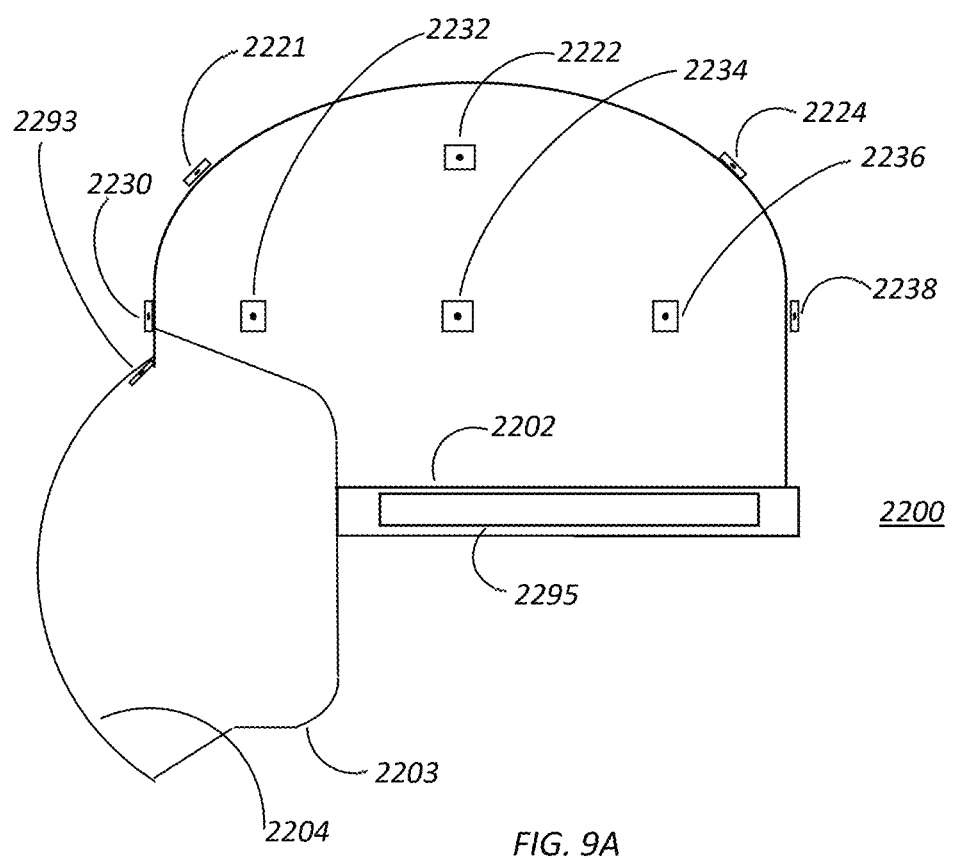
FIG. 9A illustrates an Extended Perception System with a head-mounted display and an integrated sensor subsystem.
Figure 9B:
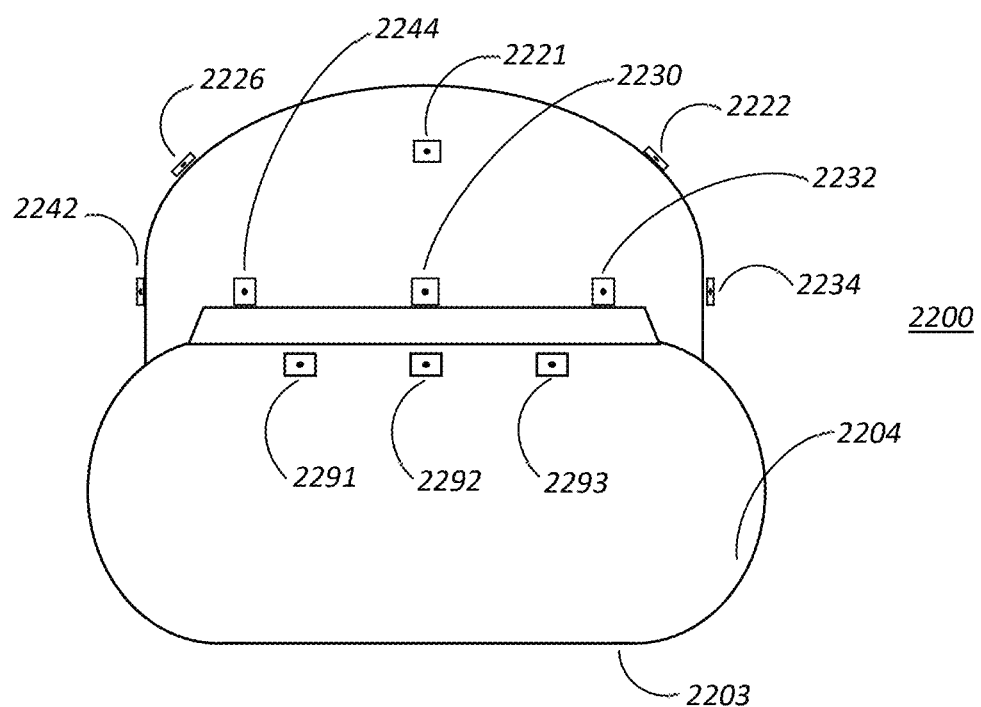
FIG. 9B illustrates an Extended Perception System with a head-mounted display and an integrated sensor subsystem.
Figure 9C:
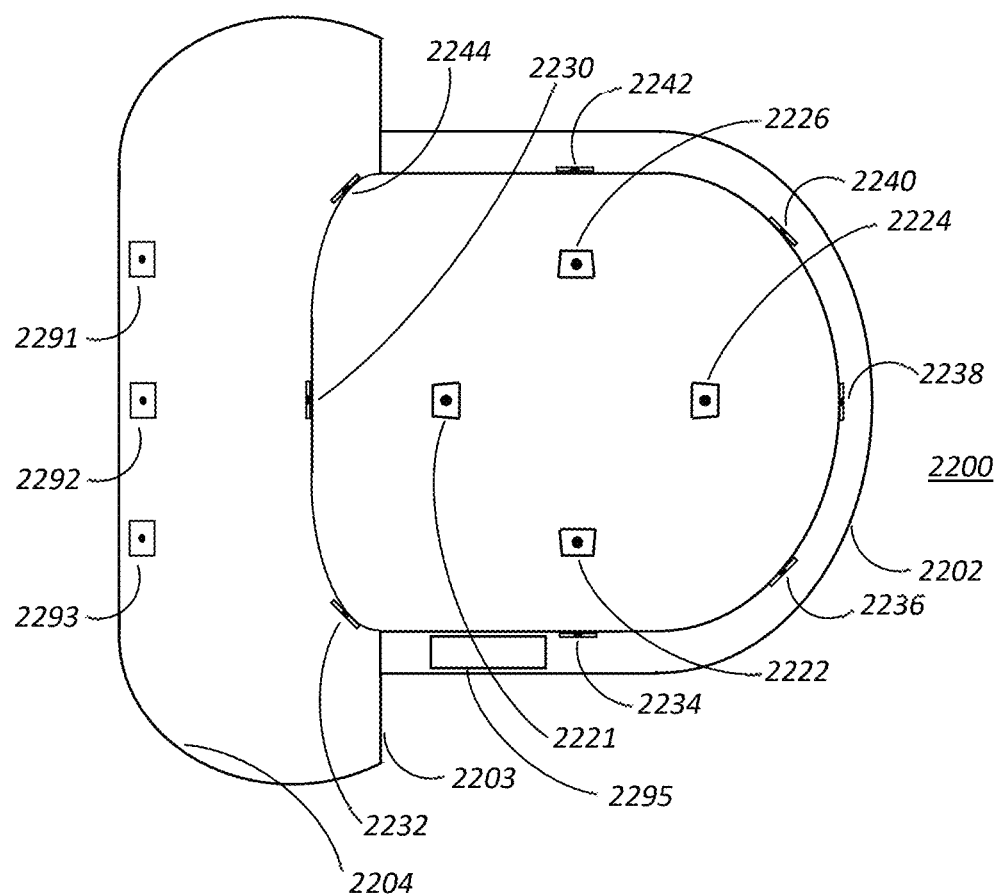
FIG. 9C illustrates an Extended Perception System with a head-mounted display and an integrated sensor subsystem.

FIGS. 9A-9C illustrate a head-mounted display 2200 with an integrated sensor subsystem similar to 600. One or more real image(s) and/or virtual image(s) and/or holographic image(s) can be projected onto, or by means of, all or part of display housing 2204. Display housing 2204 is secured to the user's head using display housing band 2202.

FIGS. 9A-9C also illustrate the optional Amplified Glance Angle Mode (AGAM), a user interface mode for example, for the display of very wide angle visual data and/or visual representations of non-visual data. AGAM can be used to display EXP Sensor Subsystem data, including EXP Sensor Subsystem data from vehicular-based EXP Sensor Subsystems, worn EXP Sensor Subsystems, fixed EXP Sensor Subsystems and/or other Sensor Subsystems, including but not limited to virtual data sensor data. AGAM can be used for the visual display of any type of data, such as data produced from business software, 2D or 3D Views software (see other patent applications by Jesse Clement Bunch), and/or video games. In AGAM, the deflection of the user's glance with respect to the direction immediately in front of the head is detected by a glance angle detection subsystem (GADS). The GADS can comprise a central camera 2292 that provides an image of one or both of the user's eyes to an EXP Processor 2295. All or part of Processor 2295 can be attached to, or built into, housing 2203 and/or band 2202 and/or located elsewhere. Processor 2295 has eye movement detection software that determines the viewing angle of one or both eyes with respect to straight ahead. Said angle of deflection of the eye (glance angle) is mapped into a deflection of the field of view on the display. For example, a glance angle of 15° to the right can cause the display to show the center of the field of view at a deflection of 90° from the user's face. The user sees in the center of his current field of view the center of what he would be seeing if his head were rotated 90° to the right via the view through camera 2242.

Embodiments of 2200 can provide a stereoscopic view by feeding different virtual and/or image information to the user's right eye than is fed to the user's left eye. In FIGS. 9A-9C, glance angle of 15° to the right can cause the display to show a stereoscopic view of what is 90° to the user's right by displaying the data from camera 2244 to his left eye and camera 2240 to his right eye. A glance angle of 15° to the left can cause the display to show a stereoscopic view of what is 90° to the user's left by displaying the data from camera 2236 to his left eye and camera 2232 to his right eye. A glance angle of 300 to the right (or left) can result in a stereoscopic view of what is directly behind the user. This does not alert observers to the direction the user is looking in. In this case, the image from camera 2240 is fed to the user's left eye and the image of camera 2236 is fed to the user's right eye. A glance angle of 15° vertically can cause the display to view the center of the field of view at a vertical deflection of 45° (upper portions of camera 2232's field of view to left eye and upper portions of camera 2244 to right eye) or 30° vertically to cause the display to view the center of the field of view at a vertical deflection of 90° (camera 2222 to left eye and camera 2226 to right eye). As the range of easy motion of each eye is roughly circular, not rectilinear, a combination of smaller glance angles in the vertical and horizontal can provide a vertical view as if the user were facing upwards and backwards. Cameras 2224 and 2238 are located as illustrated in FIGS. 9A and 9C. The mappings of glance angle to viewing angle herein are meant to be examples. The relationships between horizontal glance angle and displayed field view and vertical glance angle and displayed field of view need not be the same. Those relationships need not be limited to being linear or fixed. In some embodiments, those relationships can be adjustable by the user. Alternatively, the stereoscopic image can be constructed from two or more images in a processor before being displayed to the user. This applies to all statements in this disclosure regarding feeding one image to one eye and a different image to a second eye. Herein, a "horizontal" glance means a movement of the eyes caused substantially by the medial rectus and lateral rectus muscles of the eye. Herein, a "vertical" glance means a movement of the eyes caused substantially by the superior rectus and inferior rectus muscles of the eye.

The glance angle detection subsystem can comprise camera 2291 which provides an image of the user's right eye to processor 2295 and camera 2293 which provides an image of the user's left eye to processor 2295. When GADS has access to orientation data for both eyes, it can determine both the direction and the range where user is directing his attention. This Convergent Glance Angle Mode (CGAM) can be used to determine the location in space that the user wants to focus on. The user can signal the GADS that he wants to magnify the visual and/or audio display from that location by, for example, rapidly blinking twice or tensing the facial muscles around his eyes. Multiple applications of said signal can cause repeated magnifications in the displayed image. A different signal, such as three rapid blinks can signal a desired decrease in magnification, i.e. to increase the field of view that is displayed. Alternatively, the user's signals to the EXP Display Subsystem can be by a verbal command such as "magnify 10×", and/or other movements and/or by the tensing of given muscle groups and/or by the detection of the firing of particular neurons and/or sets of neurons in the central and/or peripheral nervous systems.

Forward looking visual sensors can be used to improve or even replace the direct forward view of the user's unaided eyes. Combinations of the front facing sensors 2220, 2230, 2232 and 2244 can replace or augment the direct view forward through the heads up partially transparent display. The transparency of the heads up display may be incrementally or continuously variable from complete transparency (direct view only, no image from the forward sensors) to partial transparency (a mix of direct view forward and image from forward sensors) to no transparency (no direct forward view, total image from forward sensors).

Figure 10A:
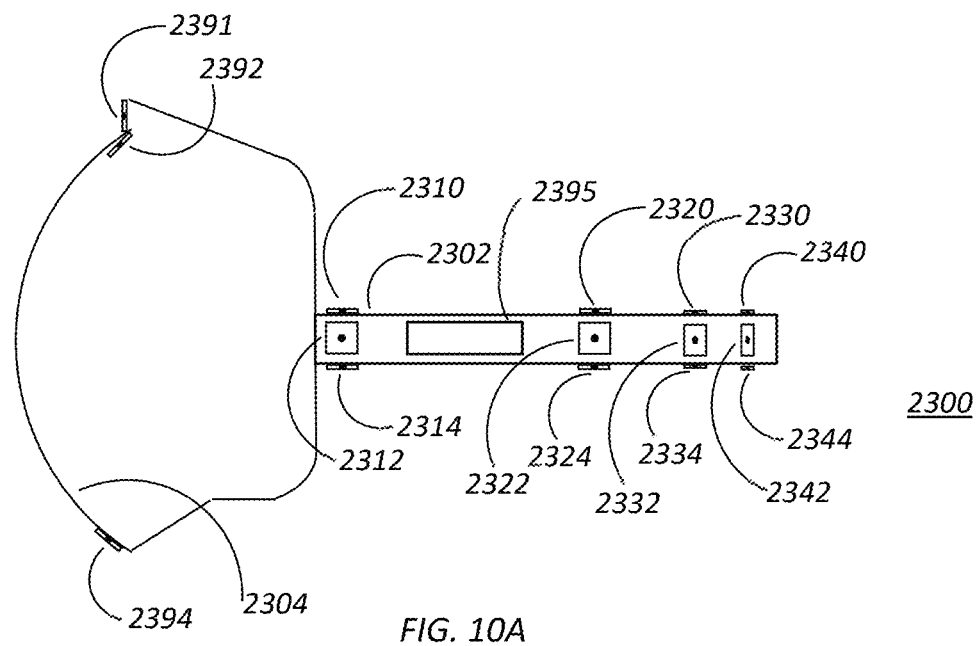
FIG. 10A illustrates an alternative Extended Perception System with a head-mounted display and an integrated sensor subsystem.
Figure 10B:
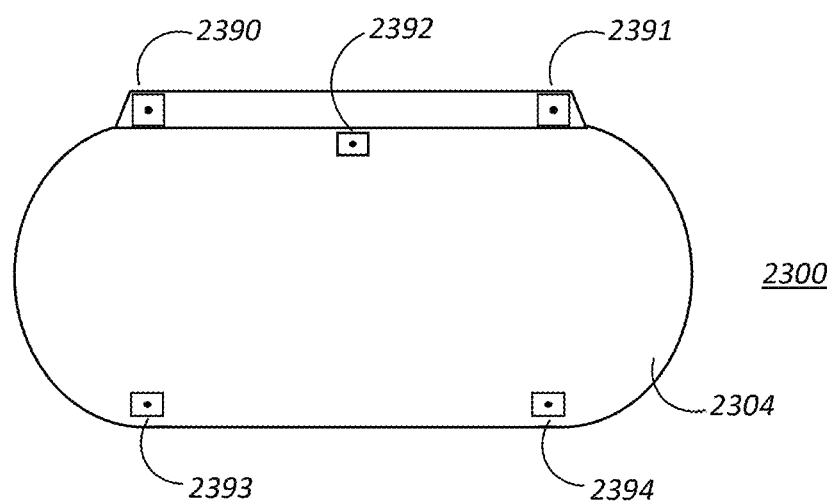
FIG. 10B illustrates an alternative Extended Perception System with a head-mounted display and an integrated sensor subsystem
Figure 10C:
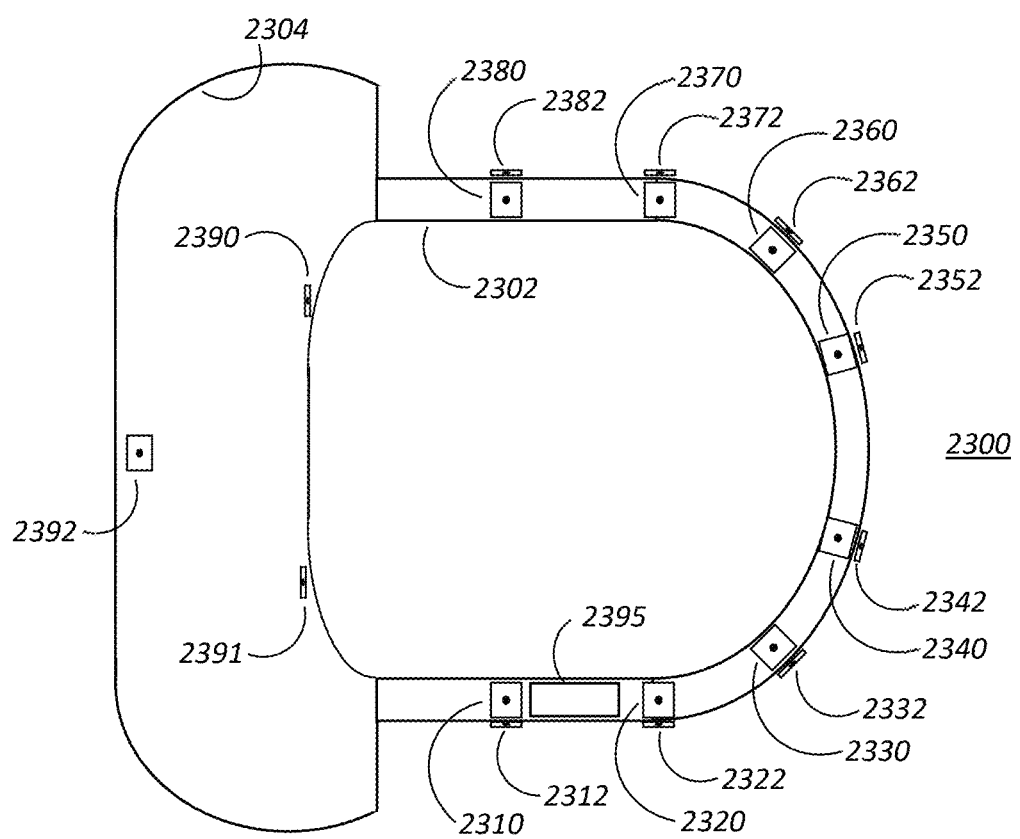
FIG. 10C illustrates an alternative Extended Perception System with a head-mounted display and an integrated sensor subsystem

FIGS. 10A-10C illustrate a head-mounted display 2300 with an integrated sensor subsystem that is similar to 2200. One or more real image(s) and/or virtual image(s) and/or holographic image(s) can be projected onto, or by means of, all or part of display housing 2304. Display housing 2304 as shown in FIG. 10A and FIG. 10B and FIG. 10C is secured to the user's head using display housing band 2302. In FIGS. 10A-10C, all but the forward-facing sensors 2390, 2391, 2393, 2394 are mounted on display housing band 2302. Other cameras comprising the optional sensor subsystem illustrated are cameras 2312, 2322, 2332, 2342, 2352, 2362, 2372, 2382, 2390, 2391 facing horizontally and cameras 2310, 2320, 2330, 2340, 2350, 2360, 2370, 2380 facing vertically upwards and cameras 2314, 2324, 2334, 2344 and four other cameras facing vertically downwards. The glance angle detection subsystem can comprise a central camera 2392 that provides an image of one or both of the user's eyes to an EXP processor 2395.

Glance location can be used to point to a menu location and a signal from the user can trigger the selection of the menu item. Said signal can, for example, be verbal and/or visual (such as a sequence of blinks). A specific signal can directly trigger a command.

Figure 11A:
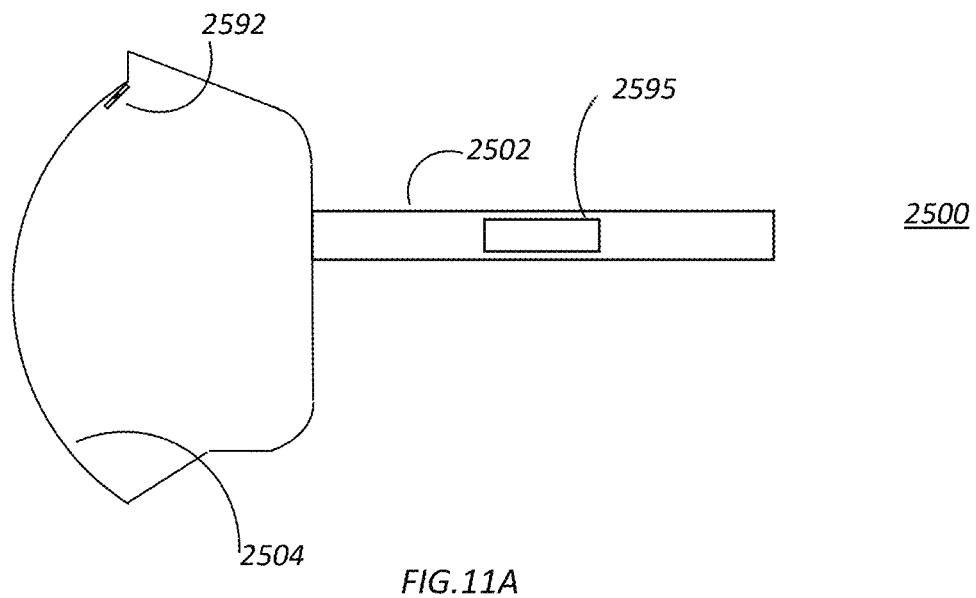
FIG. 11A illustrates an Extended Perception System with a head-mounted display.
Figure 11B:
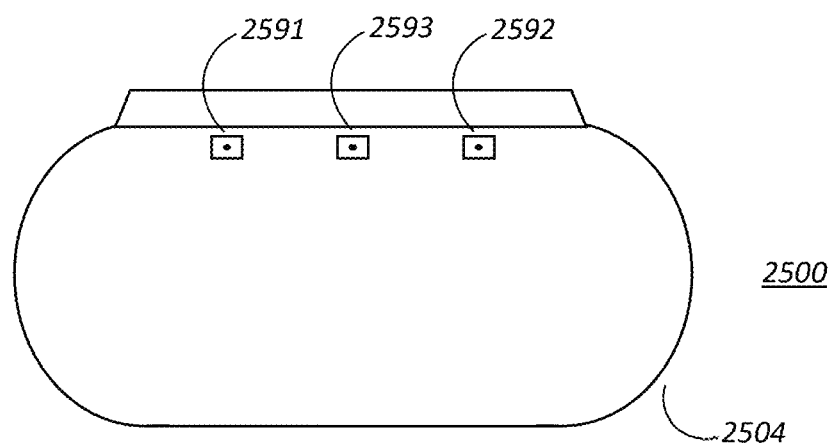
FIG. 11B illustrates an Extended Perception System with a head-mounted display.
Figure 11C:
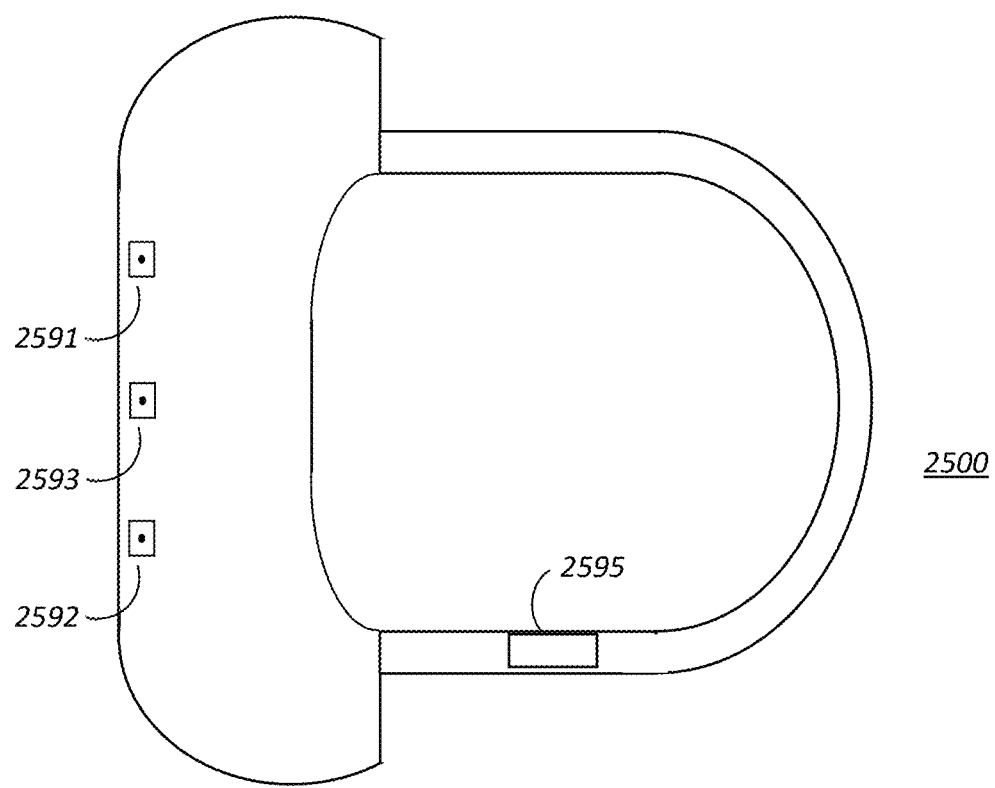
FIG. 11C illustrates an Extended Perception System with a head-mounted display.

FIGS. 11A-11C illustrate a head-mounted display 2500, similar to the display subsystem of ExP 2200. The glance angle detection subsystem can comprise camera 2591 which provides an image of the user's right eye to processor 2595 and camera 2592 which provides an image of the user's left eye to processor 2595 or central camera 2593 that provides an image of one or both of the user's eyes to an EXP processor 2595. One or more real image(s) and/or virtual image(s) and/or holographic image(s) can be projected onto, or by means of, all or part of display housing 2504. Display housing 2504 is secured to the user's head using display housing band 2502.

Glance location can be used to point to a menu location and a signal from the user can trigger the selection of the menu item. Said signal can, for example, be verbal and/or visual (such as a sequence of blinks). A specific signal can directly trigger a command.

Amplified Head Orientation Mode (AHOM)

Similar to AGAM, the user can change the orientation of his head to indicate the view angle that he wants to be displayed. For example, accelerometers in the head-mounted display, or in a device separately connected to the user's head, can be used to determine the roll and pitch of the user's head relative to the vertical. Data from an accelerometer mounted to the torso of the user can be compared with data from one or more accelerometers in the head-mounted display, or in a device separately connected to the user's head, to determine yaw motion. Other means known to the art (such as Pointing and Identification Device technologies) can be used to determine relative changes in the orientation of the user's head. Just as in AGAM, these changes can be used to signal what the EXP Display Subsystem should display. Analogous to AGAM, this is referred to as Amplified Head Orientation Mode (AHOM). For example, a change in head orientation by angle of 15° to the right can cause the display to show the center of the field of view at a deflection of 90° from the user's face. Without a side glance, the user sees in the center of his current field of view (the center of the display) the center of what he would be seeing if his head were rotated 90° to the right via the view through camera 2242. AGAM and AHOM can be implemented separately or combined to function simultaneously.

A standard display, such as an LED or LCD display can be used to display the sensor data from a vehicle's EXP Sensor Subsystem. A standard 3D display can be used to display stereoscopic AGAM.

A standard display, such as an LED or LCD display can be used to display the sensor data from an AGAM or AHOM.

Just as an array of cameras on a hat can provide different views of a space, an array of cameras can cover nearly all of the head. Cameras on other body parts can also provide useful views. For example, cameras on the front and/or tops of shoes can view upwards to see under cars for security officers to look for bombs and/or contraband mounted under vehicles. Alternatively, or together, a camera mounted between the shoulder blades of a jacket or vest can provide a view behind the user. Additionally, a camera mounted on each side of said jacket or vest below the elbows when the arms are to the side of the body and behind the normal locations of the arms can view the directions lateral to the user.

The display can be divided into areas. In each area, a view from a different combination of sensors is displayed.

AGAM and AHOM can be combined such a change in head orientation and/or glance and/or in combination can be used to signal what the EXP Display Subsystem should display.

Figure 12:
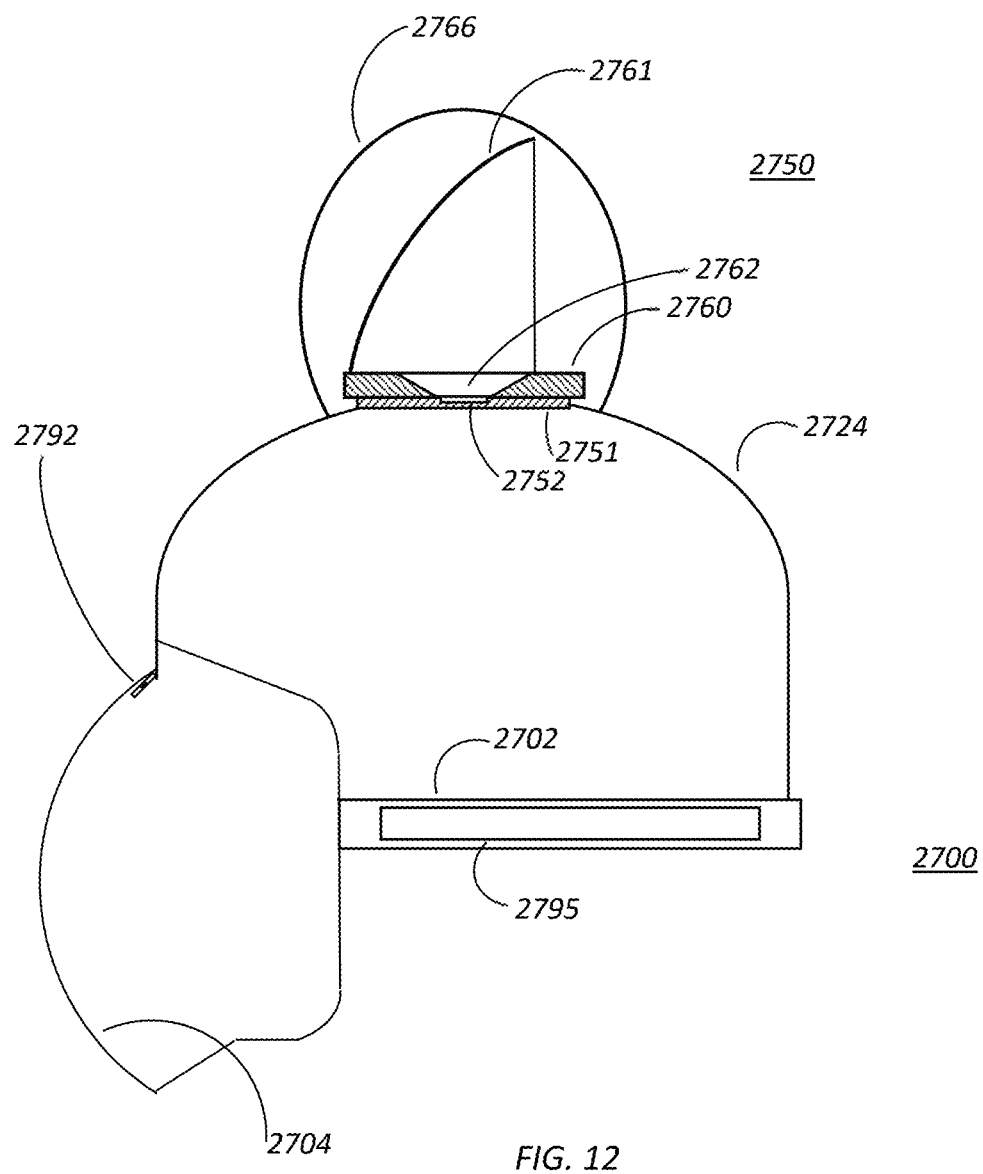
FIG. 12 illustrates an Extended Perception System with a head-mounted display and an integrated sensor subsystem employing a rotating focusing mirror.

FIG. 12 illustrates an Extended Perception System with a head-mounted display 2700 and an integrated sensor subsystem 2750 employing a rotating focusing mirror, said mirror focusing to an imaging sensor. The head mounted display 2700 is similar to the display subsystem of ExP System 2500. The glance angle detection subsystem can comprise a camera d(not shown, but analogous to camera 2591 which provides an image of the user's right eye to processor 2795 and camera 2792 which provides an image of the user's left eye to processor 2795 or central camera 2593 which that provides an image of one or both of the user's eyes to an EXP processor 2795. One or more real image(s) and/or virtual image(s) and/or holographic image(s) can be projected onto, or by means of, all or part of display housing 2704. Display housing 2704 is secured to the user's head using display housing band 2702.

EXP Sensor Subsystem 2750 employs a rotating focusing mirror, said mirror focusing to an imaging sensor. The Sensor Base 2751 of 2750 is affixed to the top of helmet 2724. Sensor Base 2751 is illustrated in cross-section so that Imaging Sensor 2752 can be illustrated. The center of Mirror Base 2760 rotates about the center of Sensor Base 2751. Sensor Base 2751 is illustrated in cross-section so that Radiation Aperture 2762 can be illustrated. Dome 2766, affixed to helmet 2724 and/or Sensor Base 2751, protects all or part of the remainder of EXP Sensor Subsystem from contamination and damage. In the illustrated orientation, radiation from behind helmet 2724 passes through Dome 2766 (which is substantially transparent to said radiation) to the interior surface of Mirror Unit 2761. Said radiation is reflected by said interior surface of Mirror Unit 2761 passing through Radiation Aperture 2762 to produce an image on Imaging Sensor 2752. EXP Sensor Subsystem 2750 can be integrated with a display subsystem as illustrated in FIG. 12 or can be a separate EXP Sensor Subsystem. A benefit of EXP Sensor Subsystem 2750 is that it permits a large area of radiation to be imaged.

Figure 13A:
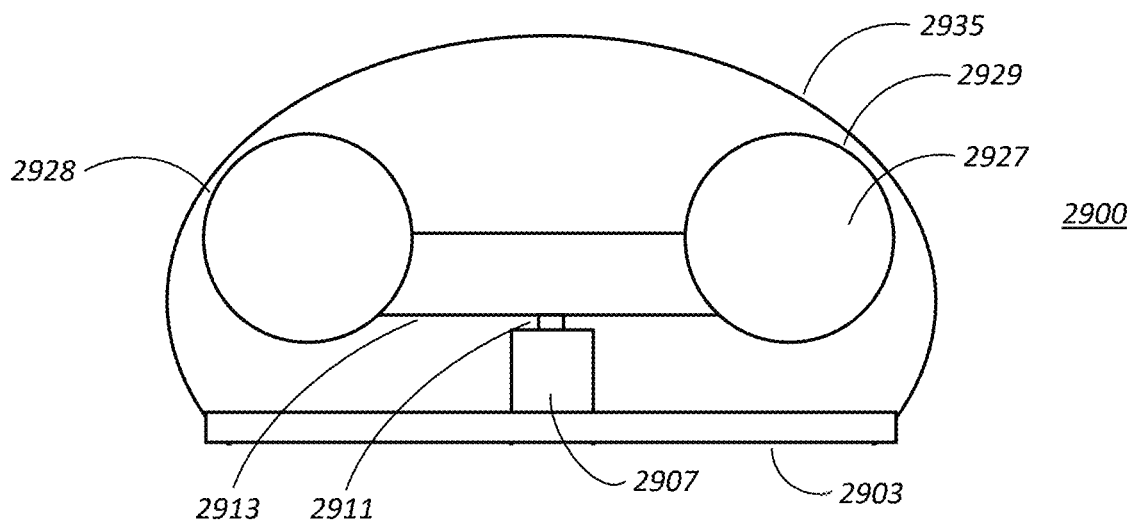
FIG. 13A illustrates an Extended Perception System Sensor Subsystem 2900 employing a rotating pair of cameras.
Figure 13B:
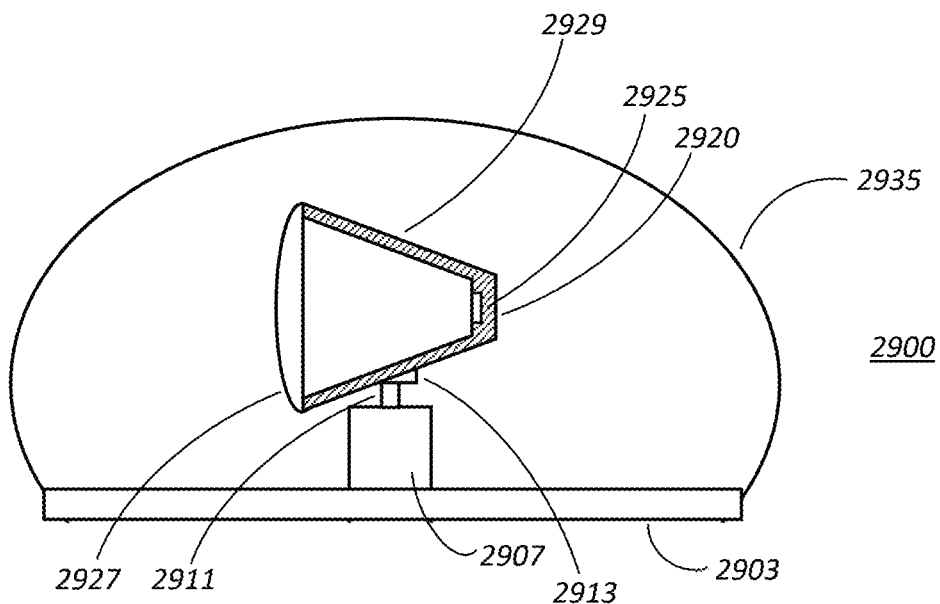
FIG. 13B illustrates an Extended Perception System Sensor Subsystem 2900 employing a rotating pair of cameras.

FIGS. 13A-13B illustrate an Extended Perception System Sensor Subsystem 2900 employing a rotating pair of cameras. The Sensor Base 2903 of 2900 is affixed to the top of a helmet like 2724. Cylindrical Platform 2907 is affixed to the center of Sensor Base 2903. Sensor Unit Support Axis 2911 rotates in the center of Cylindrical Platform 2907. For example, Cylindrical Platform 2907 can be an electric motor with Sensor Unit Support Axis 2911 being the rotating portion of said electric motor. The center of Mirror Base 2760 rotates about the center of Sensor Base 2751. Sensor Unit Arm 2913 is affixed to Sensor Unit Support Axis 2911. Substantially identical Sensor Collector Units 2928 and 2929 are affixed to opposite ends of Sensor Unit Arm 2913. Collector Unit Body 2920 is a shell, illustrated in cross-section so that the radiation path can be illustrated. Dome 2935, affixed to helmet 2724 and/or Sensor Base 2903, is substantially transparent to the radiation to be imaged on Imaging Sensor 2925 and protects all or part of the remainder of EXP Sensor Subsystem 2900 from contamination and damage. Radiation from the left is focused by Focusing Element 2927 to produce an image on Imaging Sensor 2925. The output of Collector Units 2928 and 2929 can be fed to the right and left eyes of the user(s) respectively to provide a stereoscopic view. It is easy for those knowledgeable in the art to adapt 2900 such that Sensor Collector Units 2928 and 2929 can converge to match the convergence of a user's eyes.

Figure 14A:
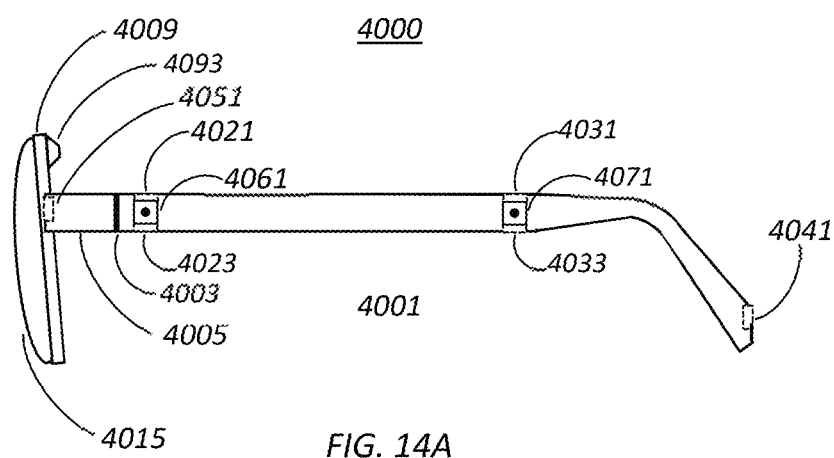
FIG. 14A illustrates an alternative Extended Perception System with a head-mounted display and an integrated sensor subsystem 4000.
Figure 14B:
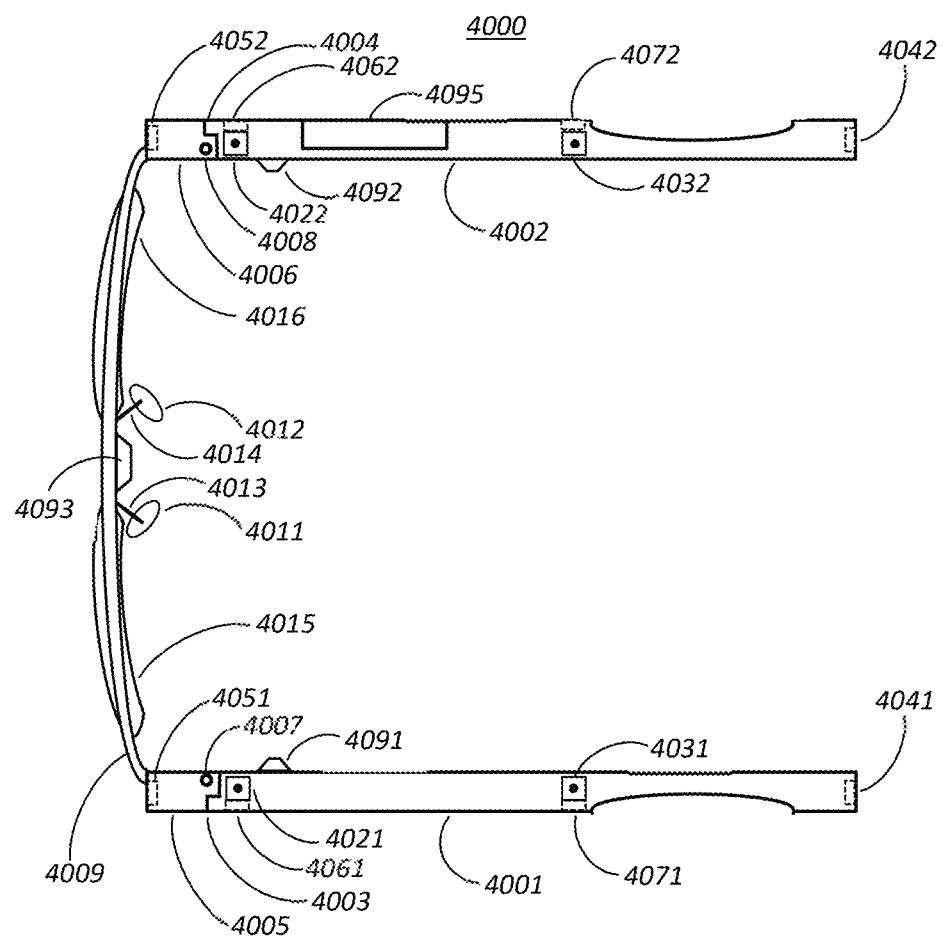
FIG. 14B illustrates an alternative Extended Perception System with a head-mounted display and an integrated sensor subsystem 4000.

FIGS. 14A-14B illustrate an Extended Perception System with a head-mounted display and an integrated sensor subsystem 4000. The head mounted display 4000 is similar to the display subsystem of ExP System 2300 in a form similar to conventional eyeglasses. In FIGS. 14A-14B, the forward-facing sensors 4051 and 4052 are mounted on the left end piece 4005 and right end piece 4006, respectively. Alternatively, forward-facing sensors 4051 and 4052 may be mounted anywhere on the head-mounted display and an integrated sensor subsystem 4000 where they may have a good forward view. In FIGS. 14A-14B, rear-facing sensors 4041 and 4042 are illustrated as mounted on the lowest portion of left earpiece 4001 and right earpiece 4002, respectively. Rear-facing sensors may be mounted anywhere on the head-mounted display and an integrated sensor subsystem 4000 where they may have a good rear view, such as on the portion of the temple partially vertical. Other cameras comprising the optional sensor subsystem illustrated are cameras 4061, 4062, 4071, and 4072 facing horizontally and cameras 4021, 4022, 4031, and 4032 facing vertically upwards and cameras 4023 and 4033 facing vertically downwards. Pin 4007 in holes in left endpiece 4005 and left temple 4001 connect them. When fully open, left endpiece 4005 and left temple 4001 are in full contact at interface 4003. Pin 4008 in holes in right endpiece 4006 and right temple 4002 connect them. When fully open, right endpiece 4006 and right temple 4002 are in full contact at interface 4004. Left nose pad 4011 and right nose pad 4012 are like traditional eyeglass nose pads and are affixed to the rims 4009 by left pad arm 4013 and right arm pad 4014, respectively. The glance angle detection subsystem can, for example, comprise a central camera 4093 that tracks of one or both of the user's eyes to an EXP processor 4095. EXP processor 4095, like all EXP processors may comprise various controls activated, for example, by touch, movement, voice, directly by the user and/or remotely. Left image projector 4091 projects images onto left lens/display 4015. Right image projector 4092 projects images onto right lens/display 4016 on head mounted display 4000.

In preferred embodiments, each of sensors 4021, 4022, 4031, 4032, 4041, 4042, 4051, 4052, 4061, 4062, 4071, and/or 4072 may, for example, comprise none, one, two, or more cameras and/or none, one, two, or more microphones. Each of said sensors may also and/or alternatively comprise none, one, or more sources of any measurable stimuli, for example, electromagnetic radiation, ambient chemicals, and/or sound to "illuminate" the surroundings.

Herein there are multiple ways of defining "vertical and horizontal." Herein, a user's surroundings or context may include, but are or is not limited to a "space" or "reference frame" in which the user is, moves in, is connected to, acts on, interacts with, and/or projects into. Nearly any Noun (as defined elsewhere herein) may be a context from the perspective of some other Noun. For example, a context for an arm could be the torso it is attached to, the body it is attached to, the room or forest it is in, the earth, solar system, etc. A context-fixed coordinate system is a coordinate system in which a given context is treated as fixed. Familiar examples include one of the various World coordinate systems (including, but not limited to, Earth-Centered Earth-Fixed, East-North-Up, and East-North-Down), the interior of a vehicle or a large, typically nearby object, such as an astronomical object or a vehicle in space. "Context vertical" is "vertical" as defined in a given context-fixed coordinate system. Context vertical is often defined as substantially parallel to the context's gravitational or apparent gravitational field. "Context horizontal" is a plane perpendicular to "context vertical."

Herein, a user-fixed coordinate system (such as a Subject Coordinate System) is a coordinate system in which a given user or subsystem thereof is treated as fixed. One example of a user-fixed coordinate system may comprise a "head." A head may refer to a human head, any animal's head, a robot's head, or the analog to a head, or that people would recognize as a head. Often, the head of an object contains the most sensors and/or is in the best position to observe the most common direction of locomotion. A head-fixed coordinate system is a coordinate system in which the user's head is treated as fixed. Examples include, but are not limited to, Subject Coordinate System/CTF, MRI coordinates, MNI Coordinates, Talairach coordinates, Neuromag Coordinates, Brainstorm .pos file format, see neuroimage.esc.edu. "Head-vertical" is "vertical" as defined in a given head-fixed coordinate system and is defined as substantially parallel to a line through the user's head, said line defined by the "top" of the user's head and the context-defined vertical orientation of the head when the user perceives his/her head to be context-defined vertical. "User-fixed horizontal" is a plane perpendicular to "user-fixed vertical." Likewise, "head horizontal" is a plane perpendicular to "head vertical."

User-specified or other H and V

Horizontal-Facing Mode (HFM)

FIGS. 14A and 14B may support AGAM. Like the other ExP Systems, FIGS. 14A and 14B may also illustrate the optional Horizontal-Facing Mode (HFM), another easy-to-use user interface mode that a user employs to designate a subset of very wide-angle visual data and/or visual representations of non-visual data for display or other purposes. HFM may be used to designate EXP Sensor Subsystem data, including EXP Sensor Subsystem data from vehicular-based EXP Sensor Subsystems, worn EXP Sensor Subsystems, fixed EXP Sensor Subsystems and/or other Sensor Subsystems, including but not limited to virtual data sensor data. HFM may be used for the visual display of any type of data, such as data produced from business software, 2D or 3D Views software (see other patent applications by Jesse Clement Bunch), and/or video games. In HFM, the primary designation is one of directions in the horizontal plane relative to the user's head: front, right, back, and left. "Front" is directly in front of the user's head. "Right" is 900 clockwise looking down on the top of the user's head. "Back" is directly in behind of the user's head. "Left" is 270° clockwise looking down on the top of the user's head. The term "horizontal-facing" refers to the fact that, in this mode, the user (in general, a given EXP Sensor Subsystem) is presented images as though said user were actually facing in the specified horizontal direction. In addition, the user may specify a vertical (context vertical and/or user-specific vertical, in this case typically head vertical) direction, "up" or "down". Pure "up" represents what the user would see if the user rotated his head and/or eyes so as to be looking directly upwards from the specified horizontal-facing direction. Pure "down" represents what the user would see if the user rotated his head and/or eyes so as to be looking directly downwards from the specified horizontal-facing direction. To achieve this view, the user specifies a horizontal-facing direction. For example, "left", "right", "back" and "front" may specify that the displayed center of the horizontal field of view . . . . Alternatively, for example, "right 55°" may specify that the displayed center of the horizontal field of view is 550 clockwise looking down from the top of the user's head. Likewise, "right 90°" would be identical to "right". "Left 75°" may specify that the displayed center of the horizontal field of view is 750 counter-clockwise looking down from the top of the user's head. The vertical component may be specified. Correspondingly, "up" may represent a movement in the displayed center of view being rotated 900 up vertically and "down" may represent a movement in the displayed center of view being rotated 900 down vertically. Alternatively, for example, "up 55°" may specify a movement of the displayed center of the vertical field of view is 550 upward from the horizontal. "Front-facing, up 270°" may specify a movement in the displayed center of view being rotated 270°, with the result being equivalent to "front-facing, down 90°." "Front-facing, up 180°" may represent a movement in the displayed center of view to be the same as "back-facing", except that the displayed images would be inverted in the user's eyes and the images in the eyes would be switched, similar to if the user bent forwards and looked backwards from between his/her legs. Alternatively, the user may specify a percentage or a fraction to designate a direction for the center of the field of view, such as "40% right, up 15%" or "one-third left, one-half up" or combinations of any of these. Likewise, the user interface may provide a mixture of AGAM and HFM, such as "left, AGAM vertical" or "AGAM horizontal, one-third up."

Said sensors may be statically and/or dynamically configured act in "stereoscopic pairs", for example, to provide sensing information for stereoscopic "vision" and/or "hearing." Table 1 illustrates some stereoscopic pairs associated with the ExP system with a head-mounted display and an integrated sensor subsystem 4000. The rows and columns are labelled with the sensor labels in FIG. 14A and FIG. 14B. The cell at the intersection of a given row and column represents the pair formed by the sensor in the specified row and the sensor in the specified column. The content in each cell, where present, represents two or three fields of information, separated by a space. The first field represents the direction that the user is virtually facing or wants to virtually face relative to the orientation of his head. In said first field, "F" represents "front"—the direction in front of the user's head (or face), "B" represents "back"—the direction behind the user's head, "L" represents "left"—the direction to the left of the user's head and "R" represents "right"—the direction to the right of the user's head. In those cells where two letters are provided for the first field, the direction specified is the combination of two horizontal directions. Where a cell contains two fields, the user's desired field of view is within field of view of the specified horizontal sensor pair. Where a cell contains three fields, the user's desired field of view is within the field of view of the specified vertical sensor pair. In said second of three fields, "U" represents "up"—the direction in above the user's head (or face), "D" represents "down"—the direction below the user's head. The last field represents the receptor, for example in the case of cameras, the "eye" to which the signal is displayed from the sensor specified by the column. In this example, "L" refers to the left "eye", "R" refers to the right "eye". Some cells contain two sets of data, illustrating the fact that a given pair of sensors may be used in two ways. An "x" in a cell designates the intersection of a row and column for the same sensor. An empty cell does not designate that the pair is not useful. For example, the cell at the intersection of row 4021 column 4032 contains two sets of data. The first set "FR U R" means that the user's field of view is to be to the front right in the horizontal direction, looking up, with data from 4032 going the right eye, thereby implying that data from 4021 goes to the left eye. The second set "BR U L" means that the user's field of view is to be to the back right in the horizontal direction, looking up, with data from 4032 going the left eye, thereby implying that data from 4021 goes to the right eye. The EXP Processor will often need to rotate the image before it is displayed to the user in order to appear natural.

As with any of the EXP Systems, image data from sensors with overlapping "fields of vision" may use "image stitching" to create a relatively continuous image with a field of view greater than any of the individual sensors. With the proper configuration of sensors, image stitching may provide the user access to a 360° view. For example, image stitched data from sensors 4052, 4072, 4041, and 4061 may provide the right eye access to a 360° horizontal view and image stitched data from sensors 4051, 4062, 4042, and 4071 may provide the left eye access to a 360° horizontal view for a front-facing perspective or reverse the eyes for a back-facing perspective. Combined, these may provide the user access to a 360° stereoscopic horizontal view. Likewise, sensors 4034, 4032/4031, 4071, and 4033 may provide the right eye access to a 360° vertical view to a right-facing perspective or the left eye access to a 360° vertical view to a left-facing perspective.

In preferred embodiments of EXP Systems illustrated by FIGS. 14A and 14B, when said sensors are cameras, there are at least two cameras facing in at least each horizontal direction to provide stereoscopic vision. In preferred embodiments, at least one pair of the cameras in each direction have a distance that is approximately equal to the user's pupillary distance, the between the centers of the pupils of the user's eyes, in order to provide a stereoscopic view equivalent to the user's natural view at the same location. In preferred embodiments, each camera is located approximately coincident with where its corresponding eye would be if the user moved his/her head to face that direction. FIGS. 14A and 14B illustrate how this may be achieved in the left-facing and right-facing directions. Temple tips extended farther than illustrated may wrap the back of the head to slightly wrap the back of the head providing a platform for cameras down-facing and back-facing cameras separated by a distance that is approximately equal to the user's pupillary distance. Front down-facing cameras 4023 may be mounted on the lower part of the rims substantially directly below the center of each eye. Front up-facing cameras 4021 and 4022 may be mounted on the upper part of the rims substantially directly above the center of each eye. Likewise, horizontal cameras front-facing 4051 and 4052 may be mounted on the upper part of the rims substantially directly above the center of each eye or on the lower part of the rims substantially below the center of each eye.

Binocular Vision

"Binocular vision" is the integration of the 2D images from each eye into a single 3D image and is a process which, scientists believe, occurs in, or just before, the V2 region of the extrastriate cortex in the visual cortex of the human brain. The user's brain may compensate for some magnitude of misalignment of the images provided to each eye. This compensation may cause the image integration to be fatiguing for a user to produce and to sustain for an extended time period.

Software Enabled Binocular Vision

To eliminate that fatigue, preferred embodiments of EXP Display subsystems may provide one or more ways to assure properly aligned images to be provided to the user's eyes. The first way is to employ software to manipulate one or both of the images. Said software may alter one or both of the 2D images to provide the appropriate angle of rotation. When the horizontal component of the gaze angle is other than 0, the eyes are, in general, a different distance from the objects in the scene. Thus, in general, the image of each object in each 2D image is smaller size in the more distant eye. Said software may alter one or both of the 2D images to provide the appropriate scaling for the objects in each 2D image. Said software may perform the image stitching discussed elsewhere herein.

The second primary way to assure the preferred alignment of the 2D images to be provided to the user's eyes is to provide the optimal location of each camera in each camera pair and the optimal location of each camera pair. In preferred embodiments, the center of each camera of each camera pair is substantially coplanar within a plane perpendicular to head vertical. In preferred embodiments, the centers of all horizontal-facing cameras will be substantially coplanar within a plane perpendicular to head vertical, the centers of all up-facing cameras will be substantially coplanar within a plane perpendicular to head vertical, and the centers of all down-facing cameras will be substantially coplanar within a plane perpendicular to head vertical. Preferred embodiments will have the distance between each camera in each primary camera pair substantially equal to the user's pupillary distance. Because the pupillary distance varies from user to user, the distance between cameras in camera pairs will vary from one unit's stereo EXP units to another.

FIGS. 15A and 15B illustrate an EXP Sensor unit 4200 that, in some embodiments, may be movable on the head-mounted EXP System such as 4000. EXP Sensor unit 4200 helps to provide the optimal location of each camera in each camera pair and the optimal location of each camera pair. As illustrated in FIG. 15B, Sensor unit 4200 may be made to slide on temple 4051 (as shown in cross-section) or some other portion of said head-mounted EXP System. Elastomeric flaps 4241 and 4242 permit simple installation of the EXP Sensor unit onto the head-mounted EXP System while keeping said EXP Sensor unit from falling off. Numerous means commonly known to the art may be used to permit the installation, alignment, and fastening of one or more ExP sensor units on a head-mounted EXP System. Horizontal-facing camera 4211 (with lens 4212), up-facing camera 4201, and down-facing camera 4221 are mounted on EXP Sensor unit housing 4031. EXP Sensor unit housing 4231 may also contain logic, power, communications, and/or other support for the sensors and/or other elements of the EXP System. It is important to make clear that while the disclosures herein typically illustrate forward-facing, back-facing, right-facing, left-facing, up-facing and down-facing sensors, there will be numerous useful embodiments where one or more of these sensors will not be needed or even desired. For example, forward-facing cameras might not be needed in see-through applications. For many users, up-facing and/or down-facing cameras will not be needed. Some users will only want rear-facing cameras. Numerous combinations of camera orientations will be useful in preferred embodiments. The movability of one or more EXP Sensor units 4200 of a pair allows for the optimal location of each camera in each camera pair. When one camera on an EXP Sensor unit with multiple cameras is properly placed, the other cameras on that EXP Sensor unit will also be properly placed. Additionally, when multiple cameras are pre-mounted on an EXP Sensor unit, image stitching of the images from each of those cameras will be easier to implement. The portion or portions 4251 of the head-mount EXP System 4000 on which one or more EXP Sensor units may be adjusted such that when on the user's head, all camera pairs of each facing type will be substantially coplanar with a plane substantially perpendicular to head vertical.

Any combination of cameras 4201, 4211, and/or 4221 may be replaced by one or more wide field of view cameras on EXP Sensor unit 4200 and on all other head-mounted and all other EXP Sensor arrays. Image distortion introduced by wide field of view cameras may be removed by software before being displayed to the user.

Camera pairs at a distance greater than pupillary distance especially when using high-resolution cameras may give the user a view as though he were closer to the objects in the field of view. Likewise, a camera pair at a distance less than the pupillary distance may be particularly useful for a user to see a view that is very close to said user.

Alternatively, for one or more of the views, pairs of cameras to produce a stereoscopic view, may be replaced by a single camera, preferably substantially at the midpoint between where the eyes would be if moved head that way. Single rear-facing horizontal, rear-facing up, and/or rear-facing down cameras may be mounted on one temple tip or the other, or an articulated, flexible and/or fixed extension of one or both temple tips. Said temple tip extension(s) may serve as a mount for one or more of the rear-facing horizontal-facing, up-facing, and/or down-facing cameras.

TABLE 1

| | L/R | 4021 | 4022 | 4023 | 4024 | 4031 | 4032 | 4033 | 4034 | 4041 | 4042 | 4051 | 4052 | 4061 | 4062 | 4071 | 4072 |
|---|---|---|---|---|---|---|---|---|---|---|---|---|---|---|---|---|---|
| Paired with | | | | | | | | | | | | | | | | | |
| 4021 | | x | FUR | | | LUL | FRUR BRUL | | | | | | | | | | |
| 4022 | | FUL | x | | | FLUL BLUR | RUR | | | | | | | | | | |
| 4023 | | | | x | FDR | | | LDL | FRDR BDRL | | | | | | | | |
| 4024 | | | | FDL | x | | | FLDL BLDR | RDR | | | | | | | | |
| 4031 | | LUR | FLUR BLUL | | | x | BUL | | | | | | | | | | |
| 4032 | | FRUL BRUR | RUL | | | BUR | x | | | | | | | | | | |
| 4033 | | | | LDR | FLDR BLDL | | | x | BDL | | | | | | | | |
| 4034 | | | | FRDL BRDR | RDL | | | BDR | x | | | | | | | | |
| 4041 | | | | | | | | | | x | BL | | | | | | |
| 4042 | | | | | | | | | | BR | x | | | | | | |
| 4051 | | | | | | | | | | | | x | FR | | | | |
| 4052 | | | | | | | | | | | | FL | x | | | | |
| 4061 | | | | | | | | | | | | | | x | | LL | |
| 4062 | | | | | | | | | | | | | | | x | | RR |
| 4071 | | | | | | | | | | | | | | LR | | x | |
| 4072 | | | | | | | | | | | | | | | RL | | x |

Figure 16A:
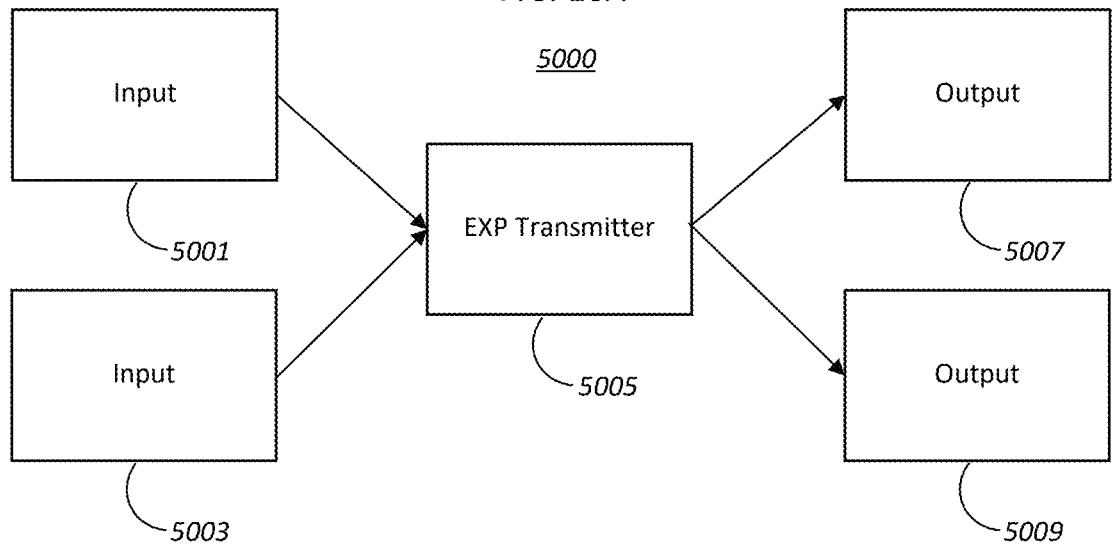
FIG. 16A illustrates Extended Perception System Transmitter System 5000
Figure 16B:
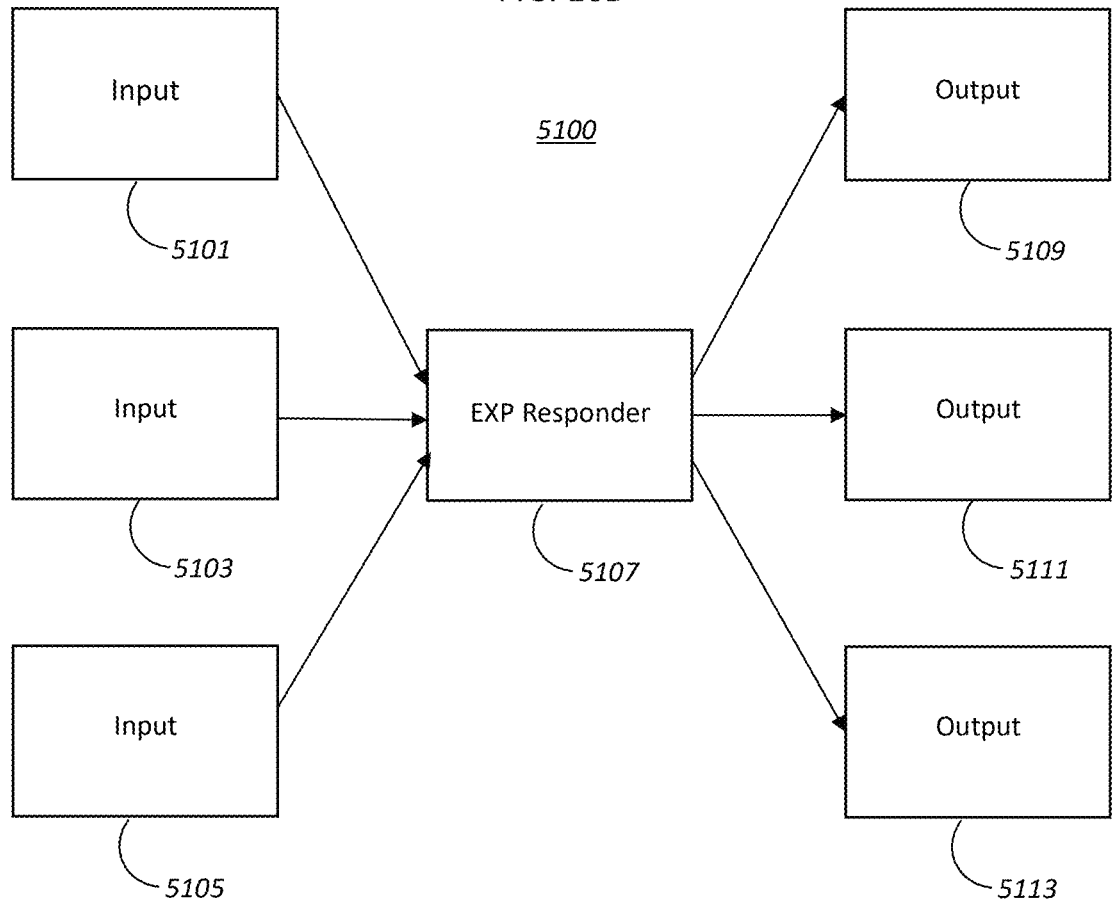
FIG. 16B illustrates Extended Perception System Responder System 5100.

FIGS. 16A-16B illustrate EXP Transmitter System 5000 and EXP Response System 5100. FIG. 16A illustrates an EXP Transmitter System 5000 where Input 5001 and Input 5003 to EXP Transmitter 5005 transmits Input 5001 and Input 5003 without alteration. Two Inputs, 5001 and 5003, and two Outputs, 5007 and 5009, are shown for illustration purposes. In an EXP Transmitter System 5000, there may be any number of inputs and any number of outputs. Herein an "Input" may represent the input itself or a receiver of said Input. Herein an "Output" may represent the output itself or a producer of said Output.

FIG. 16B illustrates an EXP Responder System 5100. Inputs 5101, 5103, and 5105 are input to EXP Responder 5107. EXP Responder 5107 produces Outputs 5109, 5111, and 5113. EXP Responder 5107 may alter and/or simply utilize Inputs 5101, 5103, and/or 5105 before generating Outputs 5109, 5111, and/or 5113. Three Inputs, 5101, 5103, and 5105 and three Outputs, 5109, 5111, and/or 5113, are shown for illustration purposes. In an EXP Responder System 5000, there may be any number of Inputs and any number of Outputs.

Figure 17A:
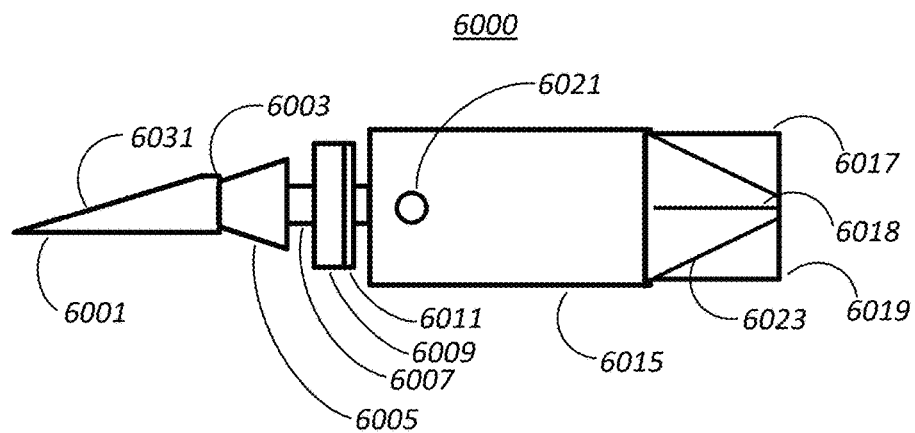
FIG. 17A illustrates Remote-Controlled Deflation Device (RCDD) 6000.
Figure 17B:
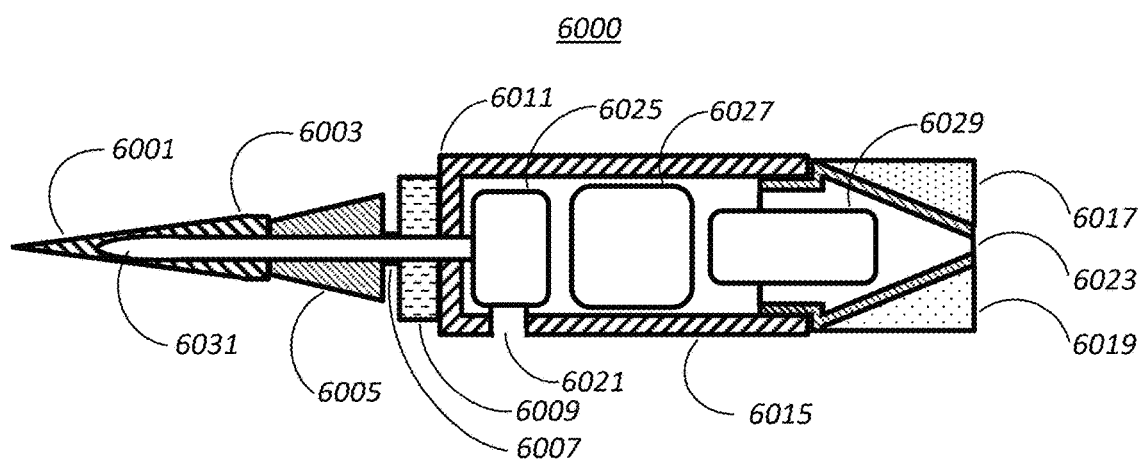
FIG. 17B illustrates Remote-Controlled Deflation Device (RCDD) 6000.

FIGS. 17A-17B illustrate an embodiment of a Remote-Controlled Deflation Device (RCDD) 6000 that may be deployed during an EXP System managed traffic stop as detailed elsewhere herein. RCDD 6000 may be delivered by "shooting" it into the side wall of a tire. Tubular element comprising 6003 and 6007 may be formed from one piece of metal has a sharp beveled point 6001. Point 6001 may resemble the tip of the cannula of a hypodermic syringe, as the tip may comprise one or more beveled surfaces. The heel or rear portion of the beveled surface may be made less sharp to reduce coring of the tire's wall which might affect the action of the valve. Said point 6001 penetrates one or more walls of said tire. The exterior surface of said point 6001, said tubular element comprising 6003 and 6007 may be lubricated to assist said penetration of said tire's wall. Point 6001 first penetrates said tire's wall followed by tubular element 6003. Next closed-cell elastomeric element 6005 (the outer surface of which may also be lubricated) affixed to the outer surface of tubular element 6007 begins to penetrate said tire's wall. Tubular element 6007 is an extension of tubular element 6003, except smaller in diameter to facilitate the compression of elastomeric element 6005. As elastomeric element 6005 passes through the tire's wall, the portion of elastomeric element 6005 in contact with said tire's wall compresses. For example, a portion of the RCDD affixed to the RCDD's penetrating shaft may be "spring loaded" and adapted to expand inside the tire and adjacent to the inner portion of the penetrated wall after penetrating that tire wall, said "spring loaded" portion may comprise an elastomeric layer that compresses during the penetration process. Those portions of elastomeric element 6005 that have passed through the tire's wall expand forming a gas pressure-tight seal on the inside of the tire's wall. Said gas pressure-tight tight seal prevents the uncontrolled deflation of said tire. Washer-shaped elastomeric element 6009 is affixed to tubular element 6007 and backed by rigid washer-shaped element 6011 which is also affixed to tubular element 6007. Washer-shaped elements 6009 and 6011 are adapted to stop the further penetration by RCDD 6000. Washer-shaped elastomeric element 6009, backed by rigid washer-shaped element 6011, is compressed by the kinetic energy of RCDD 6000, and is adapted to be sufficiently compliant with the surface of said tire's wall to form an air tight seal on the outside of the tire's wall. Compartment 6015 contains one or more valves, one or more elements that cause said valve(s) to open and/or close, one or more telecommunications modules that permit the remote control of one/or more valves, and/or sources of power for the valves, their control, the telecommunications and/or other elements necessary or useful to the operation of RCDD 6000. Said valve is controlled remotely, opening and/or closing on command to deflate the tire when and in a manner to optimize the safety of those that might be affected. Said valve may be adapted to operate in a "binary" manner, such that it is either open or closed and nowhere between. In this case, said valve may be opened and closed quickly but varying the times that it is open or closed to precisely control said flow rate. Said valve may operate in an "analog" manner, such that it the degree of its openness may be variable. The rate of deflation may be remotely controlled. Said telecommunications may be adapted to transmit the absolute internal pressure of the tire and/or the pressure differential between the inside and outside of the tire to those controlling and/or monitoring said tire's deflation. Port 6021 permits the flow of gas from the inside of the tire through RCDD 6000 to the space outside the tire. Fins 6017, 6018, and 6019 help to stabilize the flight of RCDD 6000.

FIG. 17B illustrates RCDD 6000 wherein washer-shaped element 6011 may be all or part of the forwardmost wall of compartment 6015, but is otherwise identical to RCDD 6000 (other than the scaling), but shown rotated 90° towards the viewer about the axis of its length and is cut away along plane within the page through the centerline of RCDD 6000, except where is noted herein. FIG. 17B illustrates how tubular element extends through element washer-shaped element 6011, here illustrated as the forwardmost wall of compartment 6015. Element 6031 is an opening in point 6001 that permits gas from the inside of the tire to flow through tubular elements 6003 and 6007 and to valve unit 6025 which is not cut away. When valve unit 6025 permits gas to flow from the inside of the tire, it flows to outside of the tire via 6021 an opening in compartment 6015. Element 6027, which is not cut away, comprises electronics, etc. necessary for the local control of valve 6025 and telecommunications to permit the remote monitoring and/or control of at least one element of the set: the state of the RCDD, the state of the valve, the state of the absolute internal pressure of the tire, the state of the pressure differential between the inside and the outside of the tire. The operator may control: the time, duration, gas flow rate, change in tire pressure, and/or the final air pressure value for one or more iterations of gas release. Said telecommunications may be directly to the controlling entity or relayed through another device such as a drone. Battery 6029 provides at least some of the energy necessary for the operation of said RCDD. Cap 6023 is affixed to the rear of compartment 2015. Fins 6017, 6018 and 6019 are affixed to said cap 6023. Said battery 6029 may be affixed to and/or in compartment 6015 and/or cap 6023. Wiring, antennae and other elements are not shown as their placement, interconnection, etc. are obvious to one knowledgeable to the art.

RCDD 6000 may be adapted to be propelled by a firearm. RCDD 6000 may be integrated with and/or propelled by a shotgun or other smooth-bore device. RCDD 6000 may be adapted to fit, at least in part, in a shotgun shell with a wad made from a plastic or other suitable material to protect it from damage from the hot gases produced when the shell is fired and/or to help prevent said gases from bypassing said RCDD 6000, thereby reducing the kinetic energy imparted from the burning of the shell's powder. RCDD 6000 may be adapted to be shot from a firearm with a rifled bore. In this case the fins are not included as the path of the RCDD is ballistically stabilized.

Figure 18:
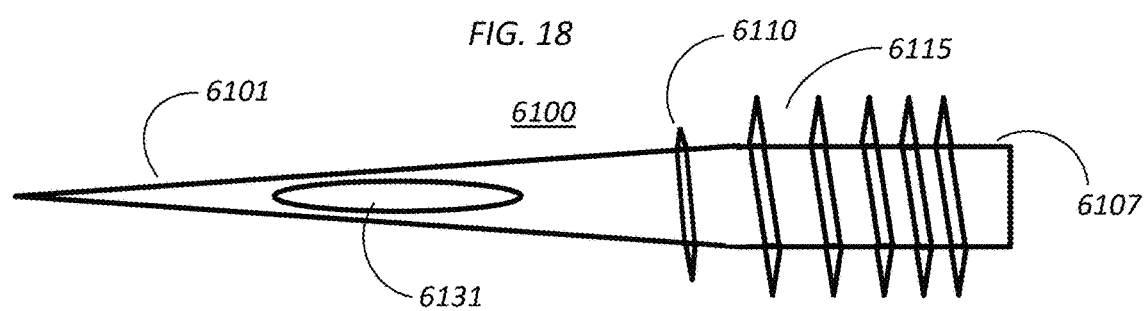
FIG. 18 illustrates an alternative front 6100 for Remote-Controlled Deflation Device (RCDD) 6000.

FIG. 18 illustrates an alternative front 6100 for RCDD 6000. Sharp point tip 6101 of said RCDD still has opening 6131. At the end of point 6101 is one or more starter threads 6110. Following the tip, the structure is tubular 6107 (6007 in FIGS. 17A and 17B) and adapted to have sharp screw-like "threads," whereby the width of the grooves between the sharp threads become progressively smaller. The greatest groove width 6115 is slightly more than the greatest tire wall thickness anticipated. The location on the RCDD where that greatest width occurs substantially coincides with a penetration of the RCDD sufficient to allow for the flow of gas from the inside of the tire to the RCDD's valve. Thereafter, the width of said grooves decreases until it is substantially equal to the minimum anticipated tire wall thickness. Thus, the RCDD twists like a screw as it penetrates until the walls of the groove compress the tire's wall to form a gas-tight seal.

Camera Hands

When the data from a camera mounted on one hand (via a glove for example) is fed to one eye of the user and the data from a camera mounted on a second hand, via a glove for example, is fed to the user's other eye, theoretically the user could move his hands so that the images would superimpose in the brain to form a single stereoscopic view. Muscle jitter and imprecision of muscle control might make that difficult. In this embodiment, the EXP Processor Subsystem uses image processing software to stabilize the image from each camera and adapt the images so that they can be superimposed into a clear stable stereoscopic image by the user's brain. The experience is as if the user had eyes spaced the distance between the cameras. This improves depth perception at greater distances. Distances between converging cameras greater and less than the distance between eyes can be profoundly useful. Cameras, such as tiny sensors close to one another with very short focal lengths can be input to the EXP display subsystem to generate stereoscopic microscopic views.

As is the case with EXP embodiments herein, this can be useful in the world or simulated in a video game.

Likewise, aircraft with motor-driven, double gimbal-mounted sensors (e.g. cameras, and/or microphones) at the front and back of the aircraft and/or on the wingtips can at the user's direction or based on feedback from the EXP Processor Subsystem and/or the Monitor Subsystem converge on a location of interest by means of CGAM, for example, to provide useful stereoscopic images at great distances.

Data from sensors in or on a vehicle being fed to a user and/or remote or local operator can help that user and/or operator to "become one" with the vehicle. Data from any Sensor Subsystem (such as the one illustrated in FIGS. 5A-5D) can be fed (for example via a Processor Subsystem as illustrated in FIG. 1) to the EXP Display Subsystem illustrated in FIGS. 11A-11C.

The EXP display can have multiple display modes. For example, in one mode, a subset of the display can show a constant sweep of the views and provide an indicator as to the direction that the sweep is showing. In second mode, a subset of the display can show one or more views in which the EXP Processor Subsystem has determined to contain events that the user needs to see.

Part of the display can be a map showing what part of the visual field is being displayed on one or a given part of the display. For example, an image of the user's head can be displayed with one or more rays pointing towards the center of the head, said each of said rays emanating from an area of interest.

Sensor Database

Sensors (e.g., cameras, and/or microphones, etc.) in a set of stationary locations and/or in or on a set of moving objects (e.g., UAVs, robots, cars, trucks, people with mobile devices and/or sensor arrays) can work together to collect real-time sensory data of about a set of locations and/or a set and/or range of view angles of a set of locations. A Sensor Database can store or access the present locations of sensors, the present direction of their fields of view and other data necessary and/or useful to determine which sensor and/or sensors will be useful when there is a need to collect sensory data on a set of objects and/or locations from the desired point of view. Additionally, said Sensor Database can store or access the range of freedom of motion of the field of view of sensors to determine if one or more nearby sensors can be directed to view the set of objects and/or locations of interest. Additionally, said Sensor Database can store or access the speeds and availability of sufficiently proximal mobile sensor platforms relative to said set of objects and/or locations. CGAM input can be used in the recruitment of multiple sensors (recruited sensors) to provide a stereoscopic view of the location of interest. Herein, "access" refers to the process of rapidly finding that information if it is not already stored in the Sensor Database.

Tiny sensors floating in the wind, or self-propelled, or dropped from vehicles, such as unmanned vehicles (including but not limited to UAVs), are additional examples of potentially proximal mobile sensors and/or sensor arrays.

As the Internet of Things grows, many more sensors will be available for access. Data from properly located sensors, a high density of disorganized sensors, and/or numerous mobile sensors can create a detailed 3D representation of a space. A CGAM-based display can be used to "view" that space by moving about an area or volume designated to represent the space. As the user moves about that area or volume, data from single sensors or pairs (or other groups) of sensors can be directed to one or both of the user's eyes to produce a changing 2D image or a changing stereoscopic image of the view from that direction and the selected range. AGAM is also useful for displaying such a space. This space can be actual or virtual or a combination thereof.

Effectors

Groups of analogous devices with efferent capabilities can be used for a wide variety of applications. For example, each element of a subset of such effectors (devices used to produce a desired change in an object in response to input) can be recruited to act as a heliostat to redirect energy from a separate source (such as the sun) to one or more areas. Each member of a subset of such effectors can be recruited to direct energy from itself to one or more areas. Such energy can include, but is not limited to, electromagnetic radiation of one or more frequencies (such as radio, microwave, IR, visible, UV) collimated or uncollimated, such as a laser or LED or acoustic radiation. Coordination of a group of effectors including, but not limited to recruited effectors can result in a device that can behave as a solar concentrator, a display, a microphone and/or many other devices. Each effector can produce a different and varying electromagnet field strength and/or direction in order for the group to implement complex static or dynamic electromagnetic fields.

Personal Effectors

There are numerous applications for one or more users to have one or more "personal effectors", effectors under the control of and/or controlled by other(s) for the benefit one or more particular user (any Noun). Any type of effector may be utilized as a personal effector. Personal effectors may temporarily, or for longer periods, be assigned to benefit a Noun. For example, multiple personal effectors may simultaneously provide multiple views of a scene, including, but not limited to, views beyond the boundaries of the Noun that they are assigned to. Multiple personal effectors may simultaneously interact with multiple objects, for example, to document the activity of, to assist, and/or to work against one or more of said multiple objects. Multiple personal effectors will be more difficult for an adversary to neutralize. Personal effectors may assist the personal effectors of others with complementary goals and/or interfere with the personal effectors of those with antagonistic goals.

One example of a personal effector is a personal drone, including, but not limited to ground-based, underwater-capable, flight-capable, and/or spaceflight-capable drones. Any Noun may have one or more dedicated personal effectors and/or may potentially recruit one or more personal effectors as available.

A "drone carrier" is any Noun adapted to transport and/or otherwise support one or more effectors. Such support can, for example, comprise one or more of: protection; provide a communications hub and/or processing hub; generate, store, and/or provide energy and/or fuel; provide service and/or maintenance; and/or any other form of support for carried and/or recruited effectors. A "personal drone carrier" is any Noun adapted to transport and/or otherwise support one or more personal drones. A mobile Noun itself and/or Nouns that travel with it (such as vehicles) and/or Nouns within a useful range of said mobile Noun may transport some or all of said mobile Noun's dedicated personal effectors. For example, a person and/or his vehicle may be a personal drone carrier. For example, a person may have one or more personal drones mounted on or in his clothing and/or on or in something said person is carrying and/or on or in a separate carrier adapted to transport and/or otherwise support said personal effectors. The user's vehicle may be adapted to be a drone carrier. A personal effector itself may be adapted to transport and/or otherwise support one or more personal effectors. An effector carrier may transport said personal effectors on the surface of, in compartments on the inside of and/or outside of, and/or mounted inside said effector carrier.

Many types of drones can, for example, serve as personal drones for one or more individuals and/or one or more vehicles and/or their occupant(s). One example is one or more quadcopters equipped with cameras and/or other sensors and/or effectors. One or more may be deployed to monitor, record, and/or otherwise serve the needs of the Noun to which they are currently assigned. Another example is potentially large numbers of small drones, such as artificial flying insects, that may act and/or be controlled independently and/or may act and/or be managed as one or more swarms. One or more ground-based drones and/or larger UAV's may be transported in a carrier and/or may transport themselves. Personal drones may be autonomous and/or controlled by the Noun to which they are assigned and/or by an EXP Monitor, using verbal and/or other means.

An effector is any set of Nouns capable of altering the state of one or more Nouns. An effector may be capable of altering its own state and/or the state of one or more of its subsystems. An effector may be capable of altering the state of one or more other Nouns and/or the state of one or more of the components of said other Nouns. In each of these cases, one or more of the Nouns and/or one or more of the components of one or more of the Nouns may be natural, artificial, and/or any combination thereof. When a sensor is able to alter the state of a Noun, it is considered to be an effector.

EXP Effectors may alter the state of any part of one or more EXP Systems. EXP Effectors may alter one or more components of any level of information via sensory system computer interfaces, nervous system computer interfaces, and/or Brain-Computer Interfaces (BCI's) utilizing one or more of many technologies such as those developed by NEURALINK.

An Effector Chain may be used in the process of turning one or more commands to act into one or more of the actions.

An ESR Response/Output Subsystem may be any subset of effectors in one or more effector chains.

Numerous effector chains exist within many types of systems, including, but not limited to: cells, multicellular organisms, social systems, and mechanical systems. Following is a relatively simple example of an effector chain. A module in a computer application may generate a high-level command to achieve a task. The effector chain may begin by sending that command to a second module of code that determines how to implement that command. That module may, for example, determine (perhaps after interrogating multiple sources) what resources are available that are able to implement that command. The results of the second module may be sent to a third module that, for example, determines which of said resources to employ and when (perhaps after interrogating multiple sources). The results of the third module may be sent to a fourth module that, for example, queues the type and duration of the activation of one or more motor control modules. At the appropriate time, said fourth module may, for example, command one or more motor control modules to cause one or more motors to act. One or more said motor control modules may then, for example, generate the signals to control the actions of one or more motors.

EXP Stimulus-Response Systems (ESR)

One EXP Model is the EXP Stimulus-Response Systems (ESR). As illustrated elsewhere herein, ESR Systems may range from very simple to very complex. An ESR includes, but may not be limited to: an ESR Stimulus Subsystem, an ESR Processor Subsystem, and an ESR Response Subsystem. A subsystem performing the role of one of these in a given ESR may perform the role of another in a different or even the same ESR. For example, a storage module will often be viewed as a subset of an ESR Processor from the perspective outside of a given ESR. However, said memory module may be updated by said (and/or other) ESR's Stimulus and/or Response Subsystems, and hence the recipient of the output of said subsystems. Likewise, said memory module may act as a source of input to said (and/or other) ESR's Stimulus and/or Response Subsystems.

Any appropriate Noun can serve as an ESR Stimulus Subsystem, including, but not limited to: the user and/or components thereof; an other or others and/or components thereof; natural and/or artificial Nouns and/or components thereof; and/or one or more combinations of the above.

Within a given ESR Processor, an EXP Storage Subsystem typically functions as a subset of said ESR's Processor Subsystem. When said EXP Storage Subsystem is used primarily by a given ESR System, said EXP Storage Subsystem is regarded as a subset of the Personal Storage of said ESR System. Storage Subsystems not usually associated with a given ESR may be recruited for a period of time. A database of Storage Subsystems available to be recruited by an ESR System may be directly or indirectly accessed via a database, said database itself being in whole, or in part, stored Personal and/or Recruited Storage.

Just as ESR Systems can comprise ESR Systems and/or subsystems, EXP Models may serve as a subset of one or more ESR Processor Subsystems.

Any appropriate Noun can serve as an ESR Response Subsystem, including, but not limited to: the user and/or components thereof; another or others and/or components thereof; natural and/or artificial Nouns and/or components thereof; and/or one or more combinations of the above.

The embodiments described herein represent mostly visual sensors and effectors. Sound (infrasound, audible sound, and/or ultrasound—through any medium, e.g., air, water, and/or ground) analog embodiments can be quite useful.

For example, arrays of directional microphones or array microphones can work together as described herein for visual sensors to localize the source of sound events, to correlate sound events with visual events, and/or to work in reconfigurable groups to "visualize" different locations from different angles and ranges.

For example, AGAM analogs can be used to have "ears in the back of the head." A sound sensor array on the bottom(s) of a set of footwear, such as boots and shoes may be used to detect and locate the origin of one or more sources of sound that has traveled through the ground (and/or other surfaces walked upon) and/or to receive communications from others. This can result in a modern and greatly improved version of the "ears down to the ground" technique. A sound sensor (and/or receiver) array on other portions of said footwear may send and/or receive sound. Additionally, and/or alternatively, transducers on the bottom(s) of said footwear may produce sound signals to communicate with others and/or create signals to mislead adversaries. Electronics and/or batteries to power these systems may reside in the heal, sole, and/or other parts of said footwear and/or other locations. Said electronics may comprise wireless and/or wired communication components.

As is the case with other EXP embodiments AGAM and CGAM will be useful interfaces for video games with displays worn by gamers like those described herein or displayed on conventional screens.

EXP Processor Subsystem

Functions of the EXP Processor Subsystem include (but are not limited to) one or more of the following, and/or combinations thereof:

1. the processing of sensor data for display to the user and/or to others (local and/or remote) and/or transfer to others. Others can comprise the EXP Monitoring Subsystem. This can be as simple as transferring the sensor data to a local display.
2. the processing of sensor data to make it more useful to display and/or transfer.
3. looking for patterns in one or multiple sensor views simultaneously to algorithmically determine the most relevant data to display and/or transfer. Many types of events may be of interest, such as the presence of potential game or dangerous animals or the presence of, or suspicious movement of one or more vehicles. This can be as simple as the detection of movement relative to the surroundings and thus can be analogous to the function of rods in the retina. This can be very useful in EXP displays where the sensor array provides data to the EXP Processor about what is outside the view of the user. When movement is detected, the User is notified of said movement and he can then observe the relevant sensor view via AGAM, for example.
4. The view of an event of interest can automatically be displayed in a display window. The type of event can be determined and displayed as well as its direction and/or location and the view in which the source is currently best observable. The user's observation of the event of interest or its source can be enhanced by highlighting its vicinity on the display or otherwise directing the user to its location in the displayed view(s). Image enhancement can improve its observation.

5. the integration of data from multiple sensors. For example, visual data from two cameras can be "aligned" for presentation to a user's eyes so as to create a 3D stereoscopic image. For example, the EXP Processor Subsystem can correlate a flash of light and a particular sound signature to determine that a shot has been fired, the type of weapon that fired the shot and sound and/or light localization algorithms can verify location and determine range of the shots.
6. the integration of sensor data, processed data, and/or augmented data and/or information from other sources.
7. the storage of sensor data and/or transfer of sensor data for storage elsewhere. This stored data can provide a multiview representation of a situation that can serve as an objective witness to that situation. The knowledge that this record is being kept will tend to prevent those with that knowledge from committing wrongful acts.

Input to an EXP Processor Subsystem comprises data from one or more, local and/or distant sensors, and/or computed and/or stored information from one or more local and/or distant sources.

Output from the EXP Processor Subsystem can be displayed locally to the user of a wearable sensor array and/or other users of wearable displays (local and/or remote) and/or others simply viewing displays (local and/or remote). Output from the EXP Processor Subsystem can be displayed locally to the driver and/or passengers of a vehicular-based sensor array and/or to other users of vehicular-based sensor arrays local and/or remote and/or others. Others local and/or remote can comprise security personnel and/or systems who can determine more about the motives and/or activities of the user of a wearable or vehicular sensor array by seeing what said user is seeing and/or is available from the user's sensor array. For example, the view inside of a vehicle, including the actions of the occupants, can be transmitted to a police car that has stopped the vehicle. This can help the police officer to determine the risk or lack thereof of approaching the vehicle. Said views can be transmitted to the police officers' supervisors so that they can assist the police officer to make better decisions. Another example is for these views to be transmitted to a security checkpoint so that the checkpoint personnel can view the actions of the vehicle's occupants. Others local and/or remote can comprise personnel and/or systems that can monitor views that the user is not viewing, evaluate the views available to his sensor array, and/or use information from other sources such as other sensor arrays to: advise the user; intervene in the situation; and/or direct the user to change his situation.

All, or parts, of the EXP Processor Subsystem can be local with respect to a subset of the sensor array. All, or parts, of the EXP Processor Subsystem can move as a subset of the sensor array moves.

All, or parts, of the EXP Processor Subsystem can be local and/or remote with respect to a subset of the sensor array.

All, or parts, of the EXP Processor Subsystem can be mobile. A subset of the EXP Processor Subsystem can comprise a mobile device, such as a mobile phone or tablet. A subset of the EXP Processor Subsystem can be worn or carried by a person. A subset of the EXP Processor Subsystem can be built into or carried in a vehicle.

All, or parts, of the EXP Processor Subsystem can be fixed.

A subset of the sensor array's communication with a subset of the EXP Processor Subsystem can be routed by direct wiring. A subset of the sensor array's communication with a subset of the EXP Processor Subsystem can be routed wirelessly via, short range communications (e.g., Bluetooth, IR, WiFi, etc.), longer range communications such as cell tower communications, and/or long range communications such as satellite or ULF or radio communications.

Aperture synthesis processing can treat a subset of a visual or auditory array as one big antenna.

EXP Intervention Subsystem

The user and/or any of the observers of EXP Sensor Subsystem data (processed or raw), the EXP Processor Subsystem data, and/or the EXP Monitoring Subsystem data that are suitably authorized can trigger an intervention. Said intervention can be real time.

Said intervention can comprise providing advice, commands, and/or information to the user and/or any of the observers of EXP Sensor Subsystem data (processed or raw), EXP Processor Subsystem data, and/or an EXP Monitoring Subsystem. Said intervention can comprise providing advice, commands, and/or information to others. For example, police, fire, rescue, ambulance, military, news and/or others might be informed to intervene in a situation. For example, the intervention can comprise information through a local loud speaker and/or a mobile device audible and/or visible to a party or parties local and/or remote who can intervene in the situation. Otherwise uninvolved persons and/or systems that are nearby can be recruited to intervene. Intervention can comprise the activation of an automated response by a user and/or any of the observers of EXP Sensor Subsystem data (processed or raw), the EXP Processor Subsystem data, and/or the EXP Monitoring Subsystem.

One embodiment employs EXP 1000 in car 1010 and is intended primarily to protect the rights of the driver. Video and audio data of car 1010's surroundings and interior are captured by EXP 1000's sensors and transmitted to the EXP Processor of EXP 1000. The data from the EXP 1000 can be streamed to a remote monitoring service (Monitor Subsystem) via the mobile device's cellular connection. Thus, EXP 1000 can detect, document and report to a monitoring service and/or car 1010's user(s) and/or insurance company and/or authorities a crash or other damage accidental or intentional to car 1010. EXP 1000 can also detect, document and report to a monitoring service and/or car 1010's user(s) and/or insurance company and/or authorities any unauthorized entry into the vehicle. As such, EXP 1000 can serve as an alarm system. This can help reduce car theft and hijackings and expedite the recovery of car 1010 in the unlikely event that it is stolen or hijacked. A device plugged into car 1010's OBD II port can wirelessly, or by wire, transmit information about car 1010 including speed information to the mobile device acting as the EXP Processor for EXP 1000. GPS and acceleration data can be captured by functions internal to that mobile device. This data from the EXP 1000 can be streamed to a remote monitoring service via the mobile device's cellular connection. If the driver is pulled over by a police officer, this data can be used to verify or deny the veracity of an accusation by a police officer. Data from car 1010's state of registration can be downloaded via the mobile device's cellular connection from that state's department of motor vehicles indicating its current registration status and emissions test status to further confirm or deny possible charges regarding the status of those variables. When a subscriber to the monitoring service is pulled over, the monitoring service can, in real time, observe and record the interaction between the police officer and the driver and passengers of car 1010. An agent of the monitoring service (with the streamed data in front of him), for example a lawyer, can then discuss the situation with the police officer and potentially provide data that confirms or denies the officer's accusation(s) via the EXP Processor's mobile device or microphone/loud speaker 1052. Microphone/loud speaker can be temporarily or of a longer duration affixed to car 1010 or can be integrated into 1034. This embodiment can help reduce inaccurate traffic stops and help to maintain a civil interaction between the police officer and driver of car 1010. EXP 1000 can also document and record road rage occurrences. Car 1010 if clearly marked as having an E×P system such as this is much less likely to be involved in theft, hijacking, road rage events, or inaccurate traffic stops. As described elsewhere herein, the view of the interior of car 1010 can be transmitted to a display viewed by the police officer and/or his supervisor(s) to make the police officer's job safer.

In EXP embodiments, the Intervention Subsystem can be used to monitor and report on other vehicles in the view of the EXP System's Sensor Subsystem. For example, an EXP Sensor Subsystem can be used to sense the tags of vehicles within their view. The EXP Processor Subsystem can interpret the sensor data to recognize the tag numbers of said vehicles. The tag number information can be compared with data downloaded locally or said tag data can be uploaded to another system to be compared with information located there. Said information can comprise information about the tag numbers of interest to authorities such as: stolen vehicles, vehicles involved in crimes (including, but not limited to Amber Alerts), vehicles with unpaid parking tickets, vehicles with expired registrations, vehicles owned by people with outstanding warrants. More actively, the EXP System can compare its vehicle's speed data (from said vehicle's computer) to visual information about other vehicles tags to determine the speed of said other vehicle. That data can be combined with GPS data to determine the legal speed limit at the location of those other vehicles. In this way, the EXP System can determine if viewed vehicles are exceeding the speed limit. When a violator has been detected, that information, plus information regarding the time, location and direction of the offending vehicle can be transmitted to the police for them to take the appropriate action. Alternatively, the EXP System can transmit its evidence of the offence to the appropriate authorities so that they can automatically generate a ticket. Likewise, EXP Processor Subsystem software can detect other offenses such as reckless driving, road rage, car jackings, impaired driving, running stop signs or lights, violations of school bus laws, etc. Such EXP Systems can be in police cruisers or other vehicles. When such an EXP System is in an individual's vehicle, it will be useful for the authorities to reward the EXP System's owner with a bounty or a reduction in the owner's vehicle registration fees. An EXP System can record crashes to determine who was responsible. An EXP System can also record activities inside a car to provide an objective record of what has occurred inside a vehicle, to determine veracity of claims such as date rape.

An EXP System in a car might utilize elements of a self-driving or otherwise automated car as E×P subsystems. An EXP System in a car might utilize elements of a car equipped with one or more built-in cameras.

Data from more than one vehicle can be integrated to provide a "view" greater than is possible with data from just one vehicle. For example, real-time data integration from multiple vehicles can track a given vehicle in real-time and non-real-time data from multiple vehicles can provide information about the location history of an otherwise non-cooperating vehicle at any given time in the past. This can be used to provide a list of suspects to a crime or to prove the innocence of others.

EXP Nouns

EXP Systems may utilize, include, manage, assist, etc. and/or otherwise interact with one or more of a large variety of what herein are referred to as "Nouns" or "nouns."

Numerous Nouns are mentioned herein. Those mentioned are to be considered examples and not intended to be exhaustive. Many of the sets mentioned intersect so there will be some redundancy. For example, products of nature include the earth's atmosphere.

Nouns include, but are not limited to, in one or more of all times, in one or more of all degrees of reality, in one or more of all contexts, from one or more of all perspectives: one or more of all perceivers; one or more of anything perceivable. Nouns include, but are not limited to: one or more of all of the systems other Nouns are part of, their subsystems, and/or components. Models (scientific and/or otherwise) and/or models of models are Nouns.

Physical, mental, spiritual and/or other spaces and subspaces and/or in one or more of all locations therein are Nouns including, but not limited to: physical space-time and/or states of mind including, but not limited to: emotions; feelings; sensations; perceptions; thoughts; the states of complexes; individual, personal unconscious levels and subdivisions; and/or collective unconscious levels and subdivisions.

Each and every object, category of object and/or objects is a Noun.

All taxonomic ranks (domain, kingdom, phylum, class, order, family, genus, species), subspecies, types, and individuals of all life forms, such as: plants and animals (including, but not limited to humans), their components and/or subsystems for example the nervous system—brain and its structures, circuits, components (axons), neurotransmitters), organs, glands, tissues, cells, DNA, RNA, chemicals, variants, combinations, components are all Nouns. All products of nature such as sap, amber, ant hills, beaver dams, animal tools are Nouns. All individuals, types, and variations of microbes, plants, animals, minerals, chemicals, atoms, nuclei, and elementary and other particles are Nouns.

All human creations are Nouns including, but not limited to: tools; machines; devices; structures; buildings; cities; mines; cyborgs; robots; sciences; medicine; arts; inventions; culture; language; music; speech; software; literature; media; knowledge; and/or information.

All systems and their subsystems are Nouns.

Environments and/or their contents are Nouns. Space and its contents including, but not limited to: galaxies; stars; planets; planetoids; asteroids, gas and/or dust clouds; matter; dark matter; electromagnetic radiation; dark energy are Nouns. Forces and fields are Nouns. Atmospheres, their climates, macroclimates, meso-climates, microclimates and/or nano-climates distant from, nearby, around and/or in one or more Nouns are Nouns. Their weather conditions are Nouns. Ambient and/or directed, static and/or variable radiation, energy, fields, etc. are Nouns.

Bodies of water and/or other liquids including, but not limited to: hydrospheres; oceans; currents; seas; bays; rivers; streams; lake; ponds; puddles; and/or drops on the side of a glass; etc. are Nouns. Substantially subsurface structures, features etc. including, but not limited to: lithospheres; lava; magma; minerals; etc. are Nouns.

Categories, subcategories, individuals, configurations and/or groups of individuals, of Nouns ongoing and/or temporary, are Nouns.

Collections, institutions, systems, subsystems, combinations of Nouns including, but not limited to: alliances; nations; city-states; regions; states; counties; (parishes, etc.); cities; Standard Metropolitan Statistical Areas; Zip-codes; communities; neighborhoods; streets; roads; boulevards; micronations, etc. are Nouns. Jurisdictions and/or organizations of Nouns including, but not limited to: governments; precincts; clubs; societies; tribes; troops of chimpanzees; hives of bees; flocks of birds; their rules (e.g., laws, bylaws, policies) are Nouns.

Subsets, portions, components, subsystems, elements, etc. of Nouns are Nouns.

States and/or configurations of states of Nouns are Nouns. An "event" is a change in state of a Noun.

Operations—on, within, and/or by one or more Nouns are Nouns. Inputs to, outputs from, and/or any and all transformations on, to, by, and/or between Nouns are Nouns.

Mixtures, combinations, compounds, and/or solutions of Nouns are Nouns.

Interactions and/or potential interactions between Nouns are Nouns. An EXP Model of interactions and/or potential interactions between Nouns may be modelled without a comprehensive EXP Model of each Noun. Modelling and/or recordings of interactions can be used to reconstruct situations and/or events for legal, historical, entertainment and/or other purposes. Videos of events, potentially with the identity removal computer replacement of faces, clothing, voices, and/or surroundings may be a form of entertainment. Recordings and/or other reconstructions of past events may be used to locate misplaced or lost objects, identify objects, and/or help refine EXP Models. A "situation" is an interaction between two or more Nouns. Refined EXP Models provide a better understanding of present situations and better prediction of future situations.

The properties of Nouns are Nouns. Each and every taxonomy of Nouns is a Noun. The ID's of Nouns are Nouns. Each perspective of each perceiver is a Noun.

Each external and internal state capable of each Noun is a Noun. Living beings are complex and therefore have many state variables. For example, some of the state variables for animals include, but are not limited to: age; gender; pain; states of illness; blood pressure; temperature; pulse; $O_2$, and/or $CO_2$ saturation; level of hunger and/or thirst; numerous others. Inanimate objects, such as an atmosphere may have numerous state variables including, but not limited to: rain; snow; sleet; hurricanes, tornadoes, and/or other storms; rainbows; lightning; thunder; wind; temperature; pressure; and/or numerous others are Nouns.

Changes of state, rates of change of state, rates of change of rates change (etc.) of states of Nouns are Nouns. A distribution of Nouns in a space is a Noun. For example: wind vector fields; temperature scalar fields and temperature change vector fields; pressure scalar fields and pressure change vector fields; and/or numerous others are Nouns. The location, speed, velocity, acceleration, jerk, of linear, circular, vibrational, and all other descriptions of location and/or changes in location are Nouns.

Nouns may be defined by one or more equations, tables and/or algorithms, etc.

When at least some of the output of one Noun may be used as at least partial input to another Noun, the set of said Nouns may be called a "Noun Chain". For example, when both Nouns may be used for Abstraction, their Noun Chain may be called an "Abstraction Chain" and/or when both Nouns may be used as Effectors, their Noun Chain may be called an "Effector Chain." A Noun Chain may contain more than two layers as exemplified elsewhere herein by the Abstraction Chains in the human visual system and the olfactory system of sharks and the Effector Chain in the motor control example elsewhere herein. At least some Noun Chains may be dynamically linked.

A Noun is considered an "internal Noun" with respect to a second Noun to the extent that the first Noun is logically internal from at least one perspective and/or context to the second Noun.

A Noun is considered an "external Noun" with respect to a second Noun to the extent that the first Noun is logically external from at least one perspective and/or context to the second Noun.

A Noun may be considered both an external Noun and an internal Noun to a second Noun.

An external Noun that is typically associated with a given set of Nouns is a Personal Noun. A Personal Noun may be a module of a system. For example, a Personal Sensor may be a sensor primarily dedicated to a given ESR System.

A Noun that may be used by one or more other Nouns may be recruited for use by the one or more other Nouns. Such a Noun is a recruitable Noun. Examples of ExP recruitable Nouns include, but are not limited to: EXP SR Systems, sensors, effectors, models, processors, computers, people, and/or their components.

The Nouns recruitable to one or more second Nouns may be generated as needed and/or stored in one or more databases. Recruitment may be dynamic. Individual and/or groups of Nouns may be recruited for durations of any length.

When a recruitable Noun is recruited for use by another Noun it is a Recruited Noun. An EXP Noun may behave in one or more capacities. For example, an EXP recruited camera is clearly a recruited sensor, but to the extent that an EXP System may alter said camera's parameters or command said camera to turn on a built-in and/or otherwise associated source electromagnetic illumination, said camera is also acting as an EXP recruited effector.

One or more Nouns may be recruited. Sets of Nouns may be recruited as a function of numerous factors including, but not limited to: access, availability priority, and/or cost. A set of sensors may be recruited, for example, to observe a set of space-time locations and/or a set of events. A set of Models and/or Abstraction Nouns may be recruited, for example, to analyze a complex problem and/or rapidly evaluate a situation that may require a rapid response. A set of Effectors may be recruited, for example, to perform tasks beyond the capability of a system's personal effectors and/or to perform tasks more quickly. Any combination of Nouns may be recruited.

EXP Model Subsystems

Implicit in an EXP Monitor Subsystem is one or more models of one or more Nouns and/or their properties to: sense and/or perceive and/or monitor potential, emerging, emergent and/or ongoing events and/or situations when intervention might reduce negative potential outcomes and/ or increase potential positive outcomes; determine and/or communicate strategies and/or tactics to intervene to prevent and/or reduce the likelihood and/or severity of said potential negative outcomes and/or increase the likelihood and/or intensity of said potential positive outcomes of said events and/or situations; and/or intervene to carry out said strategies and/or tactics.

Explicit EXP Model Subsystems develop, manage, enhance, and/or otherwise support EXP Models. EXP Model Subsystems will improve the effectiveness of EXP Monitor and Intervention Subsystems. EXP Model Subsystems may help: to interpret past and/or present events and/or situations; to predict potential outcomes of said events and/or situations; to determine the magnitude and/or direction of the desirability of said potential outcomes; to suggest methods to optimally minimize negative potential outcomes and/or optimally maximize positive potential outcomes; and/or to authorize and/or initiate one or more of said methods via an EXP Intervention Subsystem.

An important goal of EXP Systems is to assist the optimization of all experiences of its users. To achieve this goal, EXP Systems will work to model each and every Noun in each and every way. To this end, EXP Model Subsystems will employ the powerful techniques of scientific modelling. In addition, EXP Model Subsystems will employ other modelling systems, such as methods consistent with various specific symbol systems and/or their general understanding as elucidated by C. G. Jung and others, including but not limited to; metaphysical; religious; spiritual; extended analogy; and/or other systems of modelling systems. Various models may be kept separate and/or integrated to varying degrees.

EXP Models potentially have multiple properties including, but not limited to: being multilevel; being multidimensional; being multi-scaled; being all, or in part, distributed; being all, or in part, to various degrees automated and/or directly supported by humans; comprised of competing models; and/or are constantly evolving.

EXP Models may be multilevel, that is models are often comprised of models. For example, a person is a system of subsystems, each of those subsystems themselves is typically a system of subsystems, each of which may be modelled in one or more ways.

EXP Models may be multidimensional. For example, an EXP Model of a person will include, but not be limited to: EXP Models of the person's physical systems; EXP Models of the person's psychological systems; EXP Models of how the individual interacts with sociological systems; and/or EXP Models of how the individual interacts with economic systems.

EXP Models may be multi-scaled, addressing changes in realities from sub-nanoscopic scales to the scale of a universe and/or universes . . . from sub-femtosecond to time scales transcending the lives of multiple universes.

The storage of EXP Models may be distributed and/or redundant.

EXP Model Subsystems may manually and/or via algorithms employ the scientific method to cause the successive improvement of its EXP Models. One or more EXP Model Subsystems may support the development of theories of the Nouns subject to said EXP Model Subsystems. When an EXP Model is comprised of two or more competing EXP Models and/or simulations, the EXP Model Subsystem compares new events to the predictions of competing EXP Models to prove, disprove, and/or improve one or more of the Models and/or their data. The EXP Model Subsystem will, in some circumstances, use EXP System effectors to perturb relevant Nouns to test the predictions of one or more EXP Models in order to refine said EXP Models.

One way that EXP Models vary from most conventional models is that they are often not inherently task-driven . . . the goal, to the extent possible, is to implement EXP Models so as to explain and predict every aspect of the Noun and/or Nouns they model. When employed in a particular situation, an EXP Model may be simplified by ignoring variables deemed not relevant to said situation. For example, an EXP Model Subsystem may build as detailed a model of individuals as it can. For example, in a given potentially adversarial interaction between two individuals, the EXP Model for each of those individuals may be simplified to those variables relevant to that interaction. For example, the type of birthday cake eaten by each of them on their fourth birthdays need not be considered in predicting their interaction and/or how to minimize the adversariness of said interaction.

One or more EXP Model Subsystems may manage one or more EXP Models to model one or more of as many possible perspectives, for one or more of as many as possible times (past, present, future . . . from traditional, relativistic and/or time models), and/or for one or more of as many of possible degrees of reality in one or more of as many as possible levels of reality. A "perspective" as used herein is a "view" as defined elsewhere herein, a mental, and/or a synthetic perspective of one or more perceivers and/or potential perceivers. Each perceiver might have a mental perspective that is formed from typically many levels of mental perspectives. Such mental perspectives include, but are not limited to: perspectives of groups people and/or other sentient beings and/or components thereof; perspectives representing components of one or more levels of the conscious mind; perspectives representing components of one or more levels of what Swiss psychologist C. G. Jung called the "collective unconscious," including but not limited to, archetypes; and/or perspectives representing components of one or more levels of what C. G. Jung called the "personal unconscious", including but not limited to, complexes. Some perceivers will be artificial and thereby have their own various perspectives. Some perceivers will be a mixture of natural and artificial and will have the capacity to support a mixture of perspectives. Levels of reality include, but are not limited to past, actual, predicted, possible, and/or hypothetical states of: what is commonly thought of as reality; theoretical realities; fantasy realities; dreams; visions; hallucinations; reveries; fictional realities; other realms of existence; and/or other realities. The denizens and/or characters of one or more of said realities, whether or not some consider them to be "real", are to be considered as "perceivers." A perceiver is one who participates in, appears to participate in, and/or one may imagine participates in perception. Herein, "perception" includes, but is not limited to: perception as defined elsewhere herein; any awareness and/or experience of any content and/or contents of consciousness and/or any thought process or action that could contribute to the existence of and/or change in one or more contents of consciousness; sensation (such as the experience of shapes, colors, objects, sounds, tones, music, emotions, feelings, pain, pleasure, awareness of the location and/or orientation of a body part); any abstraction of sensation (such as the recognition, interpretation, judgement and/or other processing of one or more sensations); one or more thoughts; the experience of one or more thought processes; opinion; theory; etc.

EXP Model Subsystems may start simple and, as stated elsewhere herein, evolve to more accurately reflect what are modelled. Ultimately, the universe and all of its subsystems, including, but not limited to: all that humanity and its creations knows may be incorporated into one or more EXP Models.

Inputs to EXP Models

Herein, the terms "input," "afferent," "stimulus," "source," and "sensor" are interchangeable and any of which refers to the union of them all and the concept that they all emerge from. Likewise, herein, the terms "output," "efferent," "response," "sink," and "effector" are interchangeable and any of which refers to the union of them all and the concept that they all emerge from. The one or more of said terms used in a particular context herein are chosen to make the text easier to understand. For example, discussions of data processing systems typically employ the terms "input" and "output;" discussions of living entities typically employ the terms "stimulus" and "response;" discussions of nervous systems typically employ the terms "afferent" and "efferent;" discussions of EXP Systems, in general, often employ the terms "sensor subsystems" and "effector subsystems."

EXP Models employ input to help create, maintain, and/or update EXP Model(s). All or a portion of EXP Model input may result from direct and/or direct measurement. All or a portion of EXP Model input may result from self-reporting by one or more EXP Models, for example by survey. All or a portion of EXP Model input may be deduced, inferred, and/or be the product of formal or informal analogy. All or a portion of EXP Model input may be computed. All or a portion of EXP Model input may become available from one or more transactions. Examples of such transactions include, but are not limited to the purchase, trade, and/or rental.

A portion of EXP Model input may come from sources logically outside of EXP Models. EXP Sensing Subsystems may supply data to one or more EXP Models. As discussed elsewhere herein EXP Sensor Subsystems may recruit sensors including, but not limited to from one or more parts of the Internet of Things. EXP Models may use data resulting from monitoring parts of neurons, neurons, groups of neurons, and/or neural pathways utilizing Brain-Computer Interfaces (BCI's), such as those in use and development by Neuralink.

As discussed elsewhere herein, EXP Models will employ EXP Effectors (including, but not limited to, recruited effectors) to perform experiments on Nouns to refine and test one or more EXP Models, in some cases competing EXP Models. The results of said experiments (and/or other experiments) may be a source of data for EXP Models.

Inter-model communications, communications between EXP Models and/or other models, may be a source of data to one or more EXP Models.

Intra-model communications, communications between different parts of a given EXP Model, may be a source of data to one or more EXP Models.

Any form of perception as defined elsewhere herein may supply Input to EXP Models. EXP Model Subsystems may enrich data for one or more EXP Models via abstraction applied to information available to said EXP Model Subsystems. Any displayable aspect of any EXP Model may be displayed via an EXP Display Subsystem. In one example of said EXP data enrichment, EXP Abstraction modules may generate data for EXP Models by finding patterns in data. EXP Abstraction modules may have one or more levels of abstraction. Any pattern or set of patterns may be a subject of one or more EXP Abstraction modules. Patterns in any Noun and/or set of Nouns may be a subject of one or more EXP Abstraction modules.

For example, visual patterns in space are numerous. A set of examples includes, but is not limited to: edges, straight, arcuate, etc.; geometric shape(s)—point, lines, planes, circles, ellipses, parabolas, hyperbolas, cardioids; lemniscates; 3D shapes; emission/absorption; and/or shaped like other Nouns. Visual patterns with boundaries may be more easily seen when displayed by boundary emphasis using techniques, such as: pseudo-color, contrasting and/or hue intensification, vibration, and/or pulsation at one or more boundaries.

Other examples of patterns include, but are not limited to: musical; fractal; mathematical; geometric; algorithmic; artistic; and/or textile.

Changes in patterns are patterns including, but not limited to: types of motion; changes in interactions between objects; changes in motion; and/or changes in changes, etc. and may be subjects of one or more EXP Abstraction modules.

EXP Abstraction modules may enrich data via manual and/or machine-based deductive reasoning, inductive reasoning, abductive reasoning, informal analogy, formal analogy, machine learning, deep learning, other AI, and/or any other form of interpretation and/or information processing.

EXP Abstraction modules may be enriched by finding patterns between anticipated and unanticipated states and/or configurations of states and/or observed patterns that do not match those anticipated by one or more EXP Models.

One or more EXP Abstraction modules may be hierarchical, such that one or more EXP Abstraction modules may be used to assign a probability (often, simply the assumption of certainty) of the presence of and/or assignment of certain features to their Input. Said probability of the presence of said abstracted features may be combined in whole and/or in part with other input to and/or output from other EXP Abstraction modules to assign a probability (often, simply the assumption of certainty) of the presence of and/or assignment of certain features to their input. In this way, abstracted features may become part of the input to the next level of abstraction. Such hierarchical abstraction may be used in various EXP Systems and/or E×P subsystems, including but not limited to, EXP Perception Systems (where the input is at least primarily from outside said EXP System) and EXP Cognitive Systems (where the input is primarily from inside said EXP System). It is important to note that EXP Models may be used as at least a part of the abstraction process. Examples in nature of hierarchical abstraction are the perception of visual data in humans and the perception of olfactory input in sharks. In both cases, multiple layers of abstraction are employed to provide simplified models of their respective sensory data. In EXP Cognitive Systems, lower-level abstractions are combined to form higher-level abstractions.

EXP Models may be enhanced by direct human input, acquired from other sources, and/or by software including but not limited to AI (all forms).

EXP Models may obtain one or more levels of information via sensory system computer interfaces, nervous system computer interfaces, and/or Brain-Computer Interfaces (BCI's) utilizing one or more of many technologies such as those developed by Neuralink.

EXP Models may compute or otherwise determine the magnitude and/or direction of the certainty, and/or other statistical information for one or more items of its data and may constantly be refining that information. EXP Models may provide source information for one or items of its data. One or more EXP Models may use competing sources of data to refine said data.

Outputs from EXP Models

EXP Models employ output to help create, maintain, and/or update EXP Model(s). All or a portion of EXP Model output may be data and/or information that was input to that EXP Model.

All or a portion of the input to an EXP Model or other Noun may be output from an EXP Model or other Noun. All or a portion of EXP Model output may be used to identify, configure, activate, transfer commands to, and/or interactively control one or more E×P Subsystems, including, but not limited to, effectors and/or sensors. The products of any E×P subsystem may be output to one or more E×P subsystems and/or Nouns. All or a portion of EXP Model output may be used to inform any Noun. All or a portion of EXP Model output may be the product of computation, thought, deduction, inference, and/or be the product of formal and/or informal analogy. All or a portion of EXP Model output may become available for one or more transactions. Examples of such transactions include, but are not limited to the purchase, trade, and/or rental.

As discussed elsewhere herein EXP Effector Subsystems may recruit effectors including, but not limited to from one or more parts of the Internet of Things. Model output may include data and/or information resulting from monitoring parts of neurons, neurons, groups of neurons, and/or neural pathways utilizing Brain-Computer Interfaces (BCI's), such as those in use and development by NEURALINK.

As discussed elsewhere herein, EXP Models will employ EXP Effectors (including, but not limited to, recruited effectors) to perform experiments on Nouns to refine and test one or more EXP Models, in some cases competing EXP Models. The results of said experiments (and/or other experiments) may be a source of output for EXP Models.

Inter-model communications, communications between EXP Models and/or other models, may be a source of output to one or more EXP Models.

Intra-model communications, communications between different parts of a given EXP Model, may be a source of data to one or more EXP Models.

EXP Models may utilize relevant stored and/or recruited data (such as interaction modes), and data collected and/or accessed via EXP Sensors, collected and/or accessed in real-time, and/or near real-time, including, but not limited to: the locations; the physical, emotional, mental, psychological states of all participants, including, but not limited to the particular officers and civilians. Said EXP Sensors may be worn by, local to, and/or remote from one or more of the participants. An EXP Model may utilize real-time and/or near real-time data regarding the states of one or more of the participants to more accurately predict the actions of said participant. Sensor data may inform the Model and/or others regarding the health (e.g., capacity to breathe, blood oxygen levels, etc.) to recommend changes in the interaction, including, but not limited to, the provision of medical assistance to said participant. Sensor data may inform the Monitor of one or more states that would indicate the degree of an emotional state, such as happiness, anger and/or rage of a participant in the interaction. Based on previous similar states of said participant and/or similar individuals in similar situations, an EXP Model may better predict what said participant may do next. Said prediction may assist a determination of one or more EXP Intervention actions.

Applications of EXP Model(s)

EXP Models have numerous applications.

EXP Models may be used to explain prior and present events and/or such as to make assessments such as the state of mental and/or physical health of an individual.

EXP Models may be used to manage Nouns, typically through an EXP Intervention Subsystem often after notification of an EXP Monitor Subsystem.

EXP Models may employ methods to determine desirable states, outcomes and degree of that desirability based on a ranking of desired outcomes and/or the avoidance of negative outcomes.

EXP Models may report to an EXP Monitor information useful to monitor and/or regulate and/or maintain the homeostasis of Nouns, where desirable. EXP Models may be used to reduce risks to Nouns, where desirable. EXP Models may be used to enhance Nouns. EXP Models may be used to increase the probability of desired outcomes (including, but not limited to, minimizing undesired outcomes). For example, as detailed elsewhere herein, an EXP System may use one or more EXP Models to suggest to a user and/or EXP Monitor direct its attention to one or more areas to attend to optimize a potential outcome. Typically, via EXP Monitor and/or EXP Intervention Subsystems, EXP Models may change the states of Nouns, such as turn them on or off, recruit, train them, direct, and/or redirect them to one or more targets and/or activities.

One or more EXP Models may be used to make long-term and/or short-term predictions regarding the behavior of one or more Nouns and/or something that could happen to them. Said information may be communicated to one or more EXP Monitors. Said EXP Monitors may then determine that an EXP Intervention may be in the best interest of one or more EXP Nouns. Said EXP Intervention Subsystem may then execute said EXP Intervention. In some cases, EXP Sensor, EXP Model, EXP Monitor, and/or EXP Intervention Subsystems will be specialized to a limited purpose chain, analogous to a spinal reflex One or more EXP Models may predict the behavior between two or more Nouns and/or may predict the details and/or outcome of the interaction of a said two or more Nouns. Said EXP Monitor may then determine that an EXP Intervention may be in the best interest of one or more of the participating parties. An example is detailed elsewhere herein for an interaction between one or more law officers and one or more persons that are non-law officers. EXP Models may help prepare Nouns for the potential need to respond.

EXP Models may suggest a pattern of eye tracking that replicates the pattern that someone else has experienced, or is experiencing, in a virtual, real or mixed reality so that that experience will be more like the others.

If one or more EXP System users requests and/or one or more EXP Models predicts and/or senses one or more potential and/or emergent non-optimal interactions and/or events, one or more EXP Monitor Subsystems may suggest, recommend, and/or order one or more EXP Intervention Subsystems to make one or more preparations (including, but not limited to the recruitment of one or more sensor systems and/or one or more efferent systems) and/or to take one or more actions to prevent, to minimize potential sub-optimal events, to improve the probability and/or to maximize potential of optimal events.

EXP Systems may assist the standardization of interactions between Nouns. This may be especially desirable for interactions that otherwise may be inefficient, unproductive, unpleasant and/or dangerous.

For example, the interactions of authorities with civilians may be standardized. EXP Systems permit said interactions to be remotely monitored, and/or intervened in by the parties directly involved in the interaction, their representatives and/or intermediaries. An example, of such an EXP System would be head-mounted EXP Systems 4000 worn by the civilian(s), the officer(s), and/or witnesses to the interaction and/or recruited EXP Sensors fixed and/or mobile human and/or otherwise. Non-human mobile witnesses may comprise one or more drones. One or more of said witnesses may be bystanders. One or more of said witnesses may be invited or requested to come to the location and/or otherwise monitor said interaction, in advance, when an EXP Monitor anticipates an interaction and/or when requested by one or more authorities.

Many of the features traffic stop described herein are applicable to other interactions, including, but not limited to interactions between authorities and civilians not in a vehicle.

EXP Systems may improve such interactions by: making them safer for one or more parties by minimizing direct contact; making them more efficient; by assisting in the standardization of protocols for said interactions; by assisting in the monitoring, modeling, and documentation of said interactions; providing means for parties to intervene in said interactions in real-time. Herein, the officer(s) and the occupants of the vehicle that they are interacting with comprise the "direct parties."

Parties, for example, may include, but are not necessarily be limited to, one or more representatives of the police department and/or its command structure, civil authorities that said police department is accountable to, and/or other individuals and/or organizations. Parties, for example, may include, but are not necessarily be limited to, one or more representatives of the police department and/or its command structure, civil authorities that said police department is accountable to, and/or other individuals and/or organizations. Parties, for example, may include, but are not necessarily be limited to, representatives of one or more occupants may, for example, include but not necessarily be limited to, one or more insurance company(s), lawyer(s), relatives of one or more of the occupants and/or other individuals and/or organizations. Parties, for example, may include, but are not necessarily be limited to, representative(s) of and/or intermediaries for the owner of said vehicle that may include, but not necessarily be limited to, an individual, or an organization (such as a TAAS). Human and/or automated intermediaries representing one or more of the direct and/or other parties, EXP Monitor Systems and/or EXP Intervention Systems and/or their intermediaries and/or representatives that are and/or become involved in this interaction may comprise parties. Real property, property or other Nouns being transported or otherwise associated with the interaction and/or the owners or other responsible Nouns may comprise parties.

The development of ExP Ecosystems will encourage the development and establishment of predefined protocols of interaction. ExP Ecosystem enabled protocols support breaking the interaction into multiple stages to permit incremental escalation of the interaction only if required.

As the ExP Ecosystem's EXP Sensor Systems, EXP Models, and/or EXP Effectors evolve and more experience is gained said protocols may improve to address each contingency better and to address more contingencies. Said protocols may be codified in law, regulations, policies and/or recommendations provided by EXP Models. The existence of predetermined standards for interaction at each stage of an interaction may help to regulate events in interactions, in advance and/or in real-time, by limiting or prohibiting potentially unacceptable and/or less effective actions while enabling the more effective actions to reduce the risk and/or liabilities of each party. These standardized protocols may be presented to each party during said interaction so that they may better understand their rights and responsibilities at that time. Such standards make it much easier for intermediaries to assist in the management of the interaction. As the ExP Ecosystem evolves it will be increasingly able to: determine and communicate what is happening during an interaction; to predict what may occur; and/or to manage what will occur. Said protocols may be scripted. Said protocols may provide the activation and/or removal of the authorization one or more afferent and/or efferent activities such as the use of one or more types of force.

One or more EXP Monitor(s) may represent one or more of any of the parties. EXP Monitor Systems may facilitate the engagement of one or more of the parties and/or others by providing means for them to monitor one or more stages of the interaction and/or to intervene in one or more stages of the interaction. EXP Systems may provide means for parties and/or at least some of the other recipients of said information to communicate with other said parties and/or other recipients of the communications. EXP Monitor Systems may provide different levels and/or stages of one-way, two-way, and/or multipath the communication (such as: initiating, conducting, and/or terminating) exclusively and/or non-exclusively, in series, and/or in parallel with one or more of the parties. The same, or at least partially different, information from one or more sensors, abstraction modules, EXP Monitors, and/or EXP Models may be provided to different parties. For example, intermediaries trained in medicine and/or psychology may receive physical and/or neurophysiological data feeds from one or more of the parties. For example, parties may communicate and/or be communicated with via any form of communications, including, but not limited to, speakers and/or displays on one or more of said drones.

The inclusion of one or more intermediaries may be desirable as intermediaries may be specially trained to support the best outcome to the interaction between the parties. Intermediaries may be experts in the laws, regulations, and/or policies of the relevant jurisdiction and hence may be able to provide expert advice to other recipients of the communications. Intermediaries may be knowledgeable in conflict resolution and thus may assist in the most peaceful resolution of the situation, if needed. Based on the communications they receive, representatives and/or intermediaries expert in medical and/or psychological areas may help to assess the risks associated with a given situation and provide their advice to assist in the best outcome of the situation. Each EXP System may access an EXP Model to assist in attaining that best outcome.

One or more parties may establish a communication link with one or more other parties directly and/or indirectly. The link may be established with or without the identifying system communicating the identity of one or more of the parties if said parties are authorized to be anonymous.

Parties provided said information and intercommunication, may, to varying degrees, manage the interaction between the direct parties. Said management may comprise recommendations and/or orders to one or more parties, and/or personal and/or recruited EXP Sensor Systems and/or EXP Effector Systems, including, but not limited to those mounted on drones and/or other sensors and/or other efferent devices. Said management may comprise recommendations and/or commands from parties. For example, said management may comprise one or more recommendations and/or one or more orders to an officer from an officer's superior and/or someone higher in that chain of command who is monitoring and/or otherwise knowledgeable of the situation. For example, said management may comprise one or more recommendations and/or one or more orders to a civilian from one or more parties who is distantly monitoring and/or otherwise knowledgeable of the situation.

Employing EXP Models especially when informed by EXP Sensors may help to anticipate the nature of and/or to manage the interaction between direct parties at one or more of the stages of the interaction. EXP Models may model the EXP System user and/or all levels of a law enforcement organization, from the individual officer and up the chain of command, the one or more persons that are non-law officers, and/or one or more witnesses (e.g., bystanders, media, etc.) to understand their current behavior, help predict their future behavior, and/or to better negotiate with them.

Archived recordings of a subset of feeds and/or data shared or otherwise may be archived for reference as needed in the future. All interactions will provide additional data to improve the EXP Models of all participants.

A version of this EXP System may be as simple as each party having a mobile device, such as a mobile phone, supporting an EXP app (not necessarily the same EXP app) supported by each mobile device. Said app may or may not reside on one and/or more of said mobile devices.

Following is an example of an EXP System to help manage the interaction between two or more direct parties, such as one or more police officers and an occupant or person otherwise associated with a vehicle, such as the driver of the vehicle.

An Officer's attention may be drawn to one or more of the parties. By conventional means and/or my means of an EXP System.

An EXP System may direct an officer's attention to one/or more of said parties. A party may need assistance. Said EXP System may be in the officer's or another officer's vehicle. Said EXP System may be a fixed EXP System. The EXP System may be in another vehicle. A party with an EXP System may report that the vehicle or another vehicle and/or vehicles have been in an accident, a carjacking, need assistance for mechanical and/or medical issues, etc. An EXP System may direct an officer's attention to a vehicle where a party is in danger and/or may be putting others in danger. For example, the driver may be impaired or driving unsafely. A party's condition may create a hazardous or potentially hazardous situation or otherwise is breaking a law. An EXP System may be adapted to report only certain violations of the law. In situations where reporting may cause problems for one or more of the parties, the EXP System, via an EXP Intervention System, may first inform one or more of the parties of the situation and give them the opportunity to ameliorate the risk or other condition in lieu of notifying the authorities. Laws, regulations, and/or contractual constraints may require that the EXP System report some situations. Knowledge of the EXP System's reporting obligations without receiving a report from a vehicle identified as having an EXP System or the ExP Ecosystem may influence an officer to choose to not adversarially interact with said vehicle. In that event, laws, regulations, and/or department policies may prohibit an officer from interacting with said parties unless explicitly invited by them to do so.

An EXP Intervention System may interact with the party Broadcast described below.

An EXP System may automatically direct an officer's attention to another vehicle. One or more of the parties may intentionally direct an EXP System to direct an officer's attention to another vehicle, such as when that vehicle or occupant thereof may and/or appears to need assistance and/or presents a danger to said vehicle's driver, occupants and/or the community.

For example, if the officer's attention has been brought to the vehicle because it may resemble a vehicle associated with a crime committed at a known location within a known time period. The officer's EXP System may then contact the ExP Ecosystem which in turn determines the identity of this specific vehicle and may then, based on records that the ExP Ecosystem has and/or may collect, determine that this vehicle was, was not, or might have been at said scene of said crime during the specified time period and report its findings to the officer in real-time. It is preferred that the ExP Ecosystem not rely on easily altered information, such as a license plate, to exclude a vehicle from suspicion. This process may occur in whole or in part without the officer's direct intervention or even awareness. His EXP System's or the ExP Ecosystem's sensors may automatically recognize that the vehicle resembles said crime-related vehicle, then automatically query ExP Ecosystem records to determine the likelihood that said vehicle was, was not, or might have been at said scene of said crime during the specified time period. If it determines that said vehicle was not at the scene of said crime during said time period, then it may not inform the officer of the query. If, however, it determines that the vehicle was or may be related to said crime, the officer and/or his hierarchy may be so informed. Likewise, any EXP System (mobile or fixed) may perform the same function automatically, reporting the results to the appropriate authorities.

The officer may use one or more of many ways to identify the vehicle, driver, passengers and/or transported objects to get more information to assist in determining if further interaction is reasonable and to potentially acquire information needed to establish a communications link.

An officer with an EXP System may directly query the ExP Ecosystem to determine if the ExP Ecosystem may determine the identity one or more of the parties and/or if it may establish a communications link between said officer or his representatives and one or more of the parties and/o one of his representatives. An EXP System in the officer's vehicle assists the officer to get more information on the parties, by identifying one or more of the parties and/or directly querying the parties' EXP Systems.

Any of the numerous means for identifying objects and/or people and/or the locations of said parties and/or their objects, some of which are detailed in the Pointing and Identification Device U.S. Pat. No. 8,471,812 which is incorporated by reference in its entirety.

One or more directly read, entered, and/or transmitted IDs may be used to identify one or more specific parties and/or one or more objects associated with one or more of said parties. Said ID may, for example, be one or more tags (such as a sign, license plate, QR code, RFID, phone number, and/or LOID). The ID may be determined by human and/or artificial recognition (e.g., visual, audio, etc.). A unique or at least unusual set of sensor data from one or more sensors and/or one or more sensor types may assist in the process of identifying a person, vehicle, and or object. For example, a combination of video and audio data may assist in recognizing a vehicle, person and/or object. A unique set and/or locations of bumper stickers and/or vehicle damage may be used to automatically recognize the vehicle.

A vehicle, person and/or object may identify itself and/or directly provide a communications link to an authority.

The identity of one or more members of the set of: vehicles, persons, and/or objects may assist in determining the identity of another member of that set.

The ID may be deduced from the vehicle's a person, and/or an object's location. The location and/or proximity to the location of the vehicle as determined for example, by mobile device(s) and/or EXP System(s).

For example, an officer and/or the officer's EXP System may read a vehicle's license plate. That license plate information may then be uploaded to a database where that information is used to look up a list of likely drivers. If the vehicle is privately owned, vehicle registration databases and/or information from one or more insurance company may identify a list of likely drivers. If the vehicle is a rental or TAAS (Transportation as a Service) vehicle, the owner of the vehicle will have information about the likely driver(s) of the vehicle. A vehicle with an EXP System may be directly communicated with by said officer. Employing another method, an EXP System associated with the vehicle and/or an occupant of said vehicle and/or associated with a field of view containing an individual at the time of entering and/or exiting said vehicle may directly or indirectly be employed to identify one or more individuals within said vehicle.

If a list of potential occupants is determined, one or more of the members of that list may be contacted to determine which, if any, of said individual(s) are relevant parties.

These procedures may be at least to some degree automated and/or manual.

Having determined the identity of the vehicle/driver/occupants via an EXP database, the officer may collect information relevant to the interaction, to the extent authorized by laws, regulations, and or contracts before a link is established with the vehicle and/or its occupants.

Standards put in force in response to this technology may require that only a standards-specified minimum of said information must be uploaded to the officer and/or third party at the initial inquiry. For example, the officer may be granted access to current and/or historic standing/status for warrants, permissions, general record.

Based upon this information, in combination with information from the ExP Ecosystem and/or the recent reported and/or observed actions of the driver and/or vehicle, an EXP Model may, based on protocols and/or algorithms pre-approved by the relevant jurisdiction, recommend next steps which may be binding on the officer and/or parties. The EXP Model may suggest no contact or a specific protocol for interaction.

Said protocol may permit the access to more information. Multiple iterations of requests for additional information may or may not be permitted.

Where there is ambiguity regarding the salient facts and/or policies or if otherwise appropriate, an EXP user's EXP Monitor may negotiate with the officer and/or his representative regarding next steps. The EXP Model may at this point, or any other point in this process, recommend the issuance of a warning, a citation, and/or a repair order. If issued at this point, said issuance may, for example, may be without direct contact, such as via text, email, and/or conventional mail. This saves time and money, allows officers more time to do other things and eliminates unnecessary and potentially dangerous direct contact. The EXP Model may suggest communication and/or officer may decide to initiate communication, pull the vehicle over, and/or some other action. May just want to determine or confirm ID of driver and/or occupants.

If the Officer is authorized to continue, he may collect more information. The driver and/or owner of the vehicle may have access to certain activities. The driver and/or owner of the vehicle may have preauthorized permission for his EXP System to upload a subset of information available to an EXP System managed by traffic officer, and/or a third party. This information may comprise, for example: the identity of the driver as confirmed by an EXP System; said driver's driver's license information; vehicle registration for the vehicle being drive; the vehicle's state, such as, emissions status and/or the state of one or more vehicle safety features; information recorded or accessible by the EXP System regarding the vehicle's recent adherence to relevant laws, such as, recent speed information with GPS data showing compliance with the speed limit in effect where the vehicle was; acceleration data; state of the driver information, such as, physiological, emotional, and/or mental information as determined by worn and/or other sensors and/or one or more EXP Models. Said third party may comprise one or more humans, one or more software-based systems or some combination. Said third party may be may be programmed and/or officiated by a remotely located member of the police, and/or other local, regional, or national governmental and/or non-governmental organization, an EXP Monitor, or some other party.

An EXP System equipped officer may directly and/or indirectly communicate with a vehicle without pulling the vehicle over or even employing his lights and/or siren.

A link may be established via a communication device already in the proximity of or delivered to the proximity of the vehicle, person and/or object to be communicated with. A communications device may be delivered by a drone such as a UAV or UGV.

If the link is established with an EXP System, said EXP System may facilitate direct communication with a Party and/or via an EXP Monitor System. The EXP Monitor System may manage a subset (possibly all) of the interaction without (or at least with minimal) direct or indirect interaction between the officer and the EXP System user. The EXP Monitor System may act as an intermediary between the parties, facilitating the interaction. For example, the EXP System, may perform language translation. The EXP Monitor System may represent the interests of one or more of the parties. The EXP Monitor System may inform one or more of the parties regarding the rights and/or responsibilities of one or more of the parties at various stages of the interaction. The EXP Monitor System may receive commands from the officer and/or his representative, determine if said commands are legal, inform the officer and/or his representative if said commands are not legal, recommend alternatives to the officer and/or his representative, transmit proper commands to the occupants of the vehicle, recommend to the parties in the vehicle that they comply with the proper commands of the officer and/or how to deal with those commands that are not legal, escalate to higher levels in the police command structure situations where the officer and/or his representative insist on the performance of an illegal command, negotiate with the officer, his representative or others in the command structure regarding specific commands legal or otherwise, provide specific instructions as to how to properly comply, assist with the compliance, monitor that they are properly complying, and/or transmit to the officer information regarding the compliance of the parties in the vehicle. If the situation cannot be resolved between the officer's command structure and the EXP Monitor, the EXP Monitor may escalate the situation to the relevant government authority over the police and/or the media to be brought to public attention. The EXP Monitor System may be implemented via software and/or hardware and/or via humans remotely located.

The EXP Monitor System may recommend one or more actions to one or more of the parties. The EXP Monitor System may negotiate with or between one or more of the parties.

One or more of the parties and/or one or more EXP devices in use by one or more of said parties may cause a communication link to be established with the officer and/or his representative.

Having identified one or more specific parties and/or one or more objects associated with one or more of said parties as detailed elsewhere herein, said officer and/or his representative(s) may determine information necessary to initiate a link to said parties and initiate said link.

The receiving EXP System(s) may automatically authenticate the officer's identity and/or jurisdiction. If the authentication fails, the appropriate authorities may be contacted and the intended recipient(s) need not be contacted unless the EXP Device(s) determine said intended recipients should be or would want to be contacted regarding said inappropriate contact.

If authorized, the Officer or a representative thereof, may initiate interaction with the vehicle, one or more occupants of the vehicle, and/or one or more objects associated with the vehicle. This may be as simple as a phone call or text message from the officer or a staff member of the police force to a cell phone of an occupant of the vehicle. The receiver of this interaction may choose to speak directly to the officer or his representative. The receiver may choose to have the interaction monitored by the recipient's EXP Monitor. The recipient may choose to his side of the interaction, in whole or in part, be conducted by one or more of his representatives in his EXP Monitor.

The receiver of the contact may choose to accept the establishment of the call.

Once communication is established, said officer may use said communication with a target vehicle to determine the identity of the driver and/or one or more other occupants of said vehicle, for example, by directing said driver and/or one or more occupants using an available EXP System to provide real-time video and/or audio of said driver and/or one or more occupants of said vehicle. This may be as simple as one or more of the occupants of the vehicle using a cellphone to upload video and/or audio to the officer.

Video and/or audio feeds of the interior of the car and/or its surroundings may be provided by EXP Systems affixed to the vehicle such as 500, 800, and/or 1000 and/or head-mounted EXP Systems such as 600, 2200, 2300, 2500, 2700, 2900, and/or 4000.

The additional information provided by the feed may be sufficient for the officer to direct the driver to drive to a nearby police station, to pull over (if not already the case), to call for backup, to contact others, and/or to release control of the vehicle. This may reduce or eliminate the need for close contact between said officer and the driver and/or one or more other occupants of said vehicle. This reduces the risk to said Officer, the driver, one or more other occupants of said vehicle, and/or others.

If the vehicle is capable of self-driving, the occupants and/or owners of the vehicle may turn control of the driving to the officer, his representative or a third party to assure that the vehicle will self-drive to a mutually safe location.

Before, during and/or after the vehicle has pulled over, the officer and/or intermediaries for one or more of the parties may, in whole or in part, control one or more personal and/or recruited sensors and/or effectors (including, but not limited to drones). Such control may be manual or automated and/or some combination thereof. For example, people and/or AI at a remote Monitoring Subsystem may remotely control one or more drones to capture real-time or near real-time video from the scene from multiple directions and/or provide microphones to better capture the relevant sounds and/or to better position effectors such as speakers and/or displays so that the officer(s) and/or occupant(s) of the vehicle may better hear sound and/or see video from one or more members of one or more intermediaries. Artificial intelligence located in the drone and/or at another location (such as the Monitoring Subsystem) may control one or more functions of one or more of the drones. As detailed elsewhere herein, such sensors may upload one or more data feeds to one or more parties as discussed elsewhere herein.

An alternative and/or adjunct to one or more drones may comprise one or more booms affixed to one or more of the vehicles and/or drones. One or more of said booms may have a fixed and/or variable: length, angle with respect to some axis, and/or direction. One or more of said booms may have one or more sensors and/or effectors. One or more of the variable features of one or more of said booms may be controlled by an EXP Intervention Subsystem.

Other observers of the feed may monitor one or more of the feeds to identify potential risks or to inform the officer immediately if a potential risk is identified and/or appears to be emerging. If said feed(s) are insufficient to alleviate concerns over potential risks, he may call for backup or take other actions to mitigate those potential risks. These precautions will help the officer to feel more safe in approaching the vehicle. This feeling of safety may benefit the officer, the driver and other occupants of the vehicle, and/or others in the vicinity.

In preferred embodiments of this invention, the officer need not personally approach the vehicle. Most, if not all, of what might have been done during a traditional pullover may be replaced by the activity of drones, such as one or more UAVs and/or UGVs. One or more of said drones may be provided by the officer, the pulled over vehicle, and/or be recruited. One or more of said drones may provide audio, video, and/or other feeds of the situation and be controlled and/or monitored by one or more EXP Systems representing one or more of the interacting parties.

In any EXP involved event, when drones need to provide continuous service, extra drones may be deployed such that some may be charging or otherwise refueling while others are in effective use.

One or more general-purpose and/or special-purpose, manually or AI-controlled, drones may perform a weapons and/or contraband search of the vehicle and/or one or more of its occupants, if authorized. This will protect the officer from directly interacting with occupants of the vehicle. Cameras on the drones may record the details of their search to document the results and to protect the occupants from the possibility of having weapons and/or contraband planted by an officer or others.

One or more drones may attach to the vehicle (by suction and/or electromagnets, for example) and pass one or more patterns of sound (audible, infrasound and/or ultrasound) and/or electromagnetic or other radiation through the vehicle to detect signals that may identify the likely presence of contraband, for example, in hidden compartments. Multiple small drones may locate themselves in diverse locations on the vehicle to emit and/or receive said data. They may relocate on the vehicle to test different pathways for the sound patterns. One or more drones may have other sensors to detect, for example, dangerous chemical and/or biological agents, gunpowder residue, explosives, radioactivity, toxins, life forms, smuggled people, dangerous drugs, like fentanyl and/or alcohol open in vehicle.

A "Full Scan" provides another way to search vehicles for contraband and may be deployed where the vehicle is at rest or moving. One or more sources (small drones, for example) of electromagnetic and/or other radiation (terahertz, for example) may be positioned on one side of a vehicle (a truck, for example) and/or one or more receiver(s) of said radiation may be positioned on another side of said vehicle to detect said radiation. One or more of said sources and/or receivers may attach themselves to a side of the vehicle, fly along a side of the vehicle, and/or otherwise move with respect to said vehicle so as to scan at least a portion of the vehicle. For example, if one of the receivers moves in tandem with one of the sources such that the radiation is approximately perpendicular to the axis of the length of the vehicle and parallel to the ground, then the vehicle's contents may be scanned. This scan may cover a selected path or turn off over certain regions to avoid radiating people and/or other sensitive contents. The more parallel or convergent the beam, the more efficient this method will be. Varying the angle between a source and a receiver permits a 3D scan of the contents of the vehicle. This technique permits small drones to perform a high-resolution 3D scan of the contents of a vehicle. Said drones may be portable, perhaps even carried in a police car. The direction of a scanning beam may be varied relative to the orientation of a drone, the drone's orientation may be varied or some combination thereof.

Direct close-up interaction between one or more officers and one or more occupants of a vehicle may be dangerous for one or more of the parties. In preferred embodiments the need for close up interaction will be greatly minimized and, ideally, eliminated. The type and magnitude of risk may be predicted as well as the estimated precision of that prediction by an EXP Model. Based upon that information and/or other factors a direct close-up interaction may be authorized and additional measures recommended and or required to minimize that risk.

As the officer(s) approach the vehicle, their audio, movements and/or other actions are monitored by drones and/or other sensors. Likewise, the actions and audio of the occupants are monitored, for example, by video and/or audio feeds of the interior of the car and/or its surroundings provided by EXP Systems affixed to the vehicle such as 500, 800, and/or 1000 and/or head-mounted EXP Systems such as 600, 2200, 2300, 2500, 2700, 2900, and/or 4000.

The monitoring of the feeds discussed above will continue. Additional EXP Sensors and/or Effectors may be deployed and/or recruited by one or both of the parties. Additional monitoring, possibly by higher ranking intermediaries of one or more parties may be recommended by an EXP Model and or other intermediary or may be prescribed by law, regulation, and/or policy. Sensors may provide video, audio feed, from one or more angles and/or distances and/or other feeds of the interaction to capture the details of that interaction to stream one or more, locally and/or remotely, to: one or more to capture the visible interaction. While the driver is in the vehicle an EXP System may, for example, provide: one or more close up feeds of views the faces and/or hands of all parties, one or more views of their entire bodies, one or more views of the space one or both of them occupy during the interaction, driver's window, and/or the space on the driver's side of the vehicle within a few feet of the edges of the driver's window and all potentially relevant audio and other potentially relevant available data feeds.

If one or more of the occupants of the vehicle exits the vehicle, the movements, audio of each of them is monitored in close up and more inclusive views.

If it is determined that it is necessary to arrest the driver and/or one or more other occupants of the vehicle, said drones may be used to handcuff or otherwise subdue the appropriate individuals.

If a driver at any point in this interaction or other situations illegally refuses to stop, illegally drives away, one or more of multiple techniques may be employed to prevent said driver's escape without the dangers associated with a potentially high-speed chase or shots at the vehicle and/or driver.

If a driver at any point in this interaction or other situations illegally refuses to stop, illegally drives away or otherwise needs and/or wants his vehicle to be stopped (such as when a driver's brakes fail), an officer or a drone may deliver one or more Remote-Controlled Deflation Devices (RCDD) to one or more of the vehicle's tires. Said RCDD may be adapted to inflate a tire or to both inflate and/or deflate a tire.

Said RCDD may be air-borne, water-borne, and/or ground-based. Motion of said RCDD may result from the action of another device and/or be self-propelled. Said RCDD may be propelled it by an energy source external to said RCDD, including but not limited to: a first arm activated by a second arm, said first arm activated and/or energized by being run over by said tire; the release of a stored compressed gas; the detonation of a propellant such as smokeless gun powder; electromagnetic energy as employed by a railgun; and/or some combination thereof. Said RCDD launched from a drone, an officer, or another party.

Said RCDD may be self-propelled. Said RCDD may be affixed to, or "shot" from, a drone similar to one or more conventional drone designs, but adapted to perform the functions disclosed herein. Said RCDD may be propelled by other means including, but not limited to: one or more rocket engines and/or jet engines.

Said RCDD's path may be simple projectile motion and/or guided internally and/or externally by software and/or a human operator, using technologies known to the art. The path of the RCDD may be stabilized ballistically or via fins, typically towards its rear.

Said RCDD may be a drone and launched from another drone, an officer, or another party.

Rather than a wall of the tire, an RCDD may be deployed to penetrate the treaded portion of the tire. Said deployment may be as described above or simply via the tire running over the penetrating front of the RCDD.

Alternatively, or as a part of, or in parallel to the use of an RCDD, a drone may affix a GPS-based tracking device on the fleeing vehicle. One or more UAVs and/or small unmanned ground vehicles (UGV) may follow the vehicle, sending to authorities a location, speed, direction, video, audio, and/or other sensor data to assist in the apprehension the vehicle and its driver. If the driver exits the vehicle to escape, one or more UAV's and/or UGVs may follow the driver sending to authorities the location, speed, direction, video, audio and/or other sensor data to assist in the apprehension of the driver.

If the driver has an EXP System, said EXP System may send tracking and other data to an EXP Monitor, EXP Intervention System and/or the relevant authorities. A further benefit is that said EXP Intervention System and/or other authorities may continue communication with said driver, such that expert negotiators may be employed to convince the driver to surrender. If said driver is fleeing out of fear of unfair treatment by authorities, and EXP Intervention System representative may negotiate a surrender at a time, place and/or manner that will help to assure the driver that he will be treated fairly.

EXP Sensor Systems on the vehicle, the officer's vehicle, and/or other personal and/or recruited sensors may monitor the traffic to predict a threat to any of the parties, such as traffic that could strike an officer and/or one of the vehicles. If a potential threat is identified, the vehicle or other parties and/or an EXP Intervention System may warn the parties at rick and/or take other actions to prevent or reduce the damage from such an event.

Likewise, an EXP System, such as one utilized by one or more Officers' vehicles and/or emergency vehicles may use this technology to communicate manually and/or automatically with multiple vehicles. This EXP Broadcast mode may be used to communicate potentially useful information and/or command other vehicles and/or other EXP Systems. For example, such an EXP System may be employed to contact one or more vehicles to pull over, for example, to afford said officer(s) and/or other emergency vehicle(s) an unblocked path. Another application of such an EXP Broadcast is to request assistance of the communicated-to vehicle(s), such as the location of a target vehicle and/or a description/feed of information about a situation out of the range of said officer(s) and/or emergency vehicle(s) and/or has a different view of a situation of interest to said officer(s) and/or emergency vehicle(s). Alternatively, a non-official EXP User may want to communicate directly with one or more officer(s) and/or other official(s) and/or other non-officials. One or more of said parties may use an EXP System to update a real-time mapping system such as GOOGLE® Maps or the overall EXP System regarding an emergent situation. These are examples of the numerous potential uses.

Other applications of the Full Scan detailed elsewhere herein may be applied to numerous scanning applications as embodiments of this invention. For example, the above discloses transmissive (absorptive) scanning. Likewise, they may be easily applied to reflective scanning.

The Full Scan invention disclosed herein may be applied to numerous construction, maintenance, repair, modification, and/or demolition applications. For example, drones may be used to add substances to an object such as painting an object. The selective addition of substances to an object may be applied to numerous applications such as the selective application of paint to use relatively small drones to paint large murals or using drones for additive 3D printing. Drones may be used to selectively remove substances from an object such as sanding and/or other surface preparation an object.

There are limits to the weight that drones may lift for useful periods of time. One way to deal with this is for multiple drones to work together. Another way is for a drone to carry a supply line from another location. For example, a relatively small drone set up for sandblasting or painting may have power supplied by an extended line from a larger drone or a "ground" may provide extended power via compressed air, fuel, and/or electricity. Likewise, materials such as paint and/or sand may be transferred by an extended line. Also, one or more other drones may "ferry" materials and/or power sources to one or more drone dedicated to one or more particular task.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A pressure-tight container pressure control assembly, configured to adjust internal pressure in a pressure-tight container, the pressure-tight container pressure control assembly comprising:
    a housing having an attachment end, wherein the attachment end is configured to penetrate a wall of the pressure-tight container;
    a seal, arranged around the housing and configured to form an airtight seal between the housing and the wall; and
    a pressure controller, arranged in the housing and configured to provide a controlled transfer of a material between the housing and the pressure-tight container through the wall thereby adjusting an internal pressure of the material within the pressure-tight container.

2. The pressure-tight container pressure control assembly of claim 1, wherein the wall of the pressure-tight container further comprises a surface not originally adapted to receive the attachment end.

3. The pressure-tight container pressure control assembly of claim 1, wherein the pressure controller further comprises a communication circuit and is configured to be remotely activated.

4. The pressure-tight container pressure control assembly of claim 1, wherein the pressure controller further comprises a timer such that the pressure controller is programmed with a timer delay that delays operating the pressure controller after puncturing the wall.

5. The pressure-tight container pressure control assembly of claim 4, wherein the timer delay is at least two seconds.

6. The pressure-tight container pressure control assembly of claim 4, wherein the timer delay is less than or equal to two hours.

* * * * *